(12) United States Patent
Ohta et al.

(10) Patent No.: US 7,778,281 B2
(45) Date of Patent: Aug. 17, 2010

(54) WIRELESS COMMUNICATION APPARATUS

(75) Inventors: Yoshitaka Ohta, Suita (JP); Seiji Harada, Osaka (JP); Yasuo Hamamoto, Sakai (JP)

(73) Assignee: Panasonic Corporation, Osaka (JP)

( * ) Notice: Subject to any disclaimer, the term of this patent is extended or adjusted under 35 U.S.C. 154(b) by 2611 days.

(21) Appl. No.: 10/132,528

(22) Filed: Apr. 24, 2002

(65) Prior Publication Data
US 2002/0181459 A1 Dec. 5, 2002

(30) Foreign Application Priority Data
Apr. 27, 2001 (JP) ............................. 2001-131417

(51) Int. Cl.
*H04J 3/06* (2006.01)
(52) U.S. Cl. ...................................... 370/503; 370/474
(58) Field of Classification Search ................ 370/503,
370/504, 507, 510, 512, 514, 516, 517, 518,
370/520, 474, 476, 480
See application file for complete search history.

(56) References Cited

U.S. PATENT DOCUMENTS

| | | | | |
|---|---|---|---|---|
| 5,537,101 A * | 7/1996 | Nakajima et al. | ...... | 340/825.21 |
| 5,822,317 A * | 10/1998 | Shibata | .................. | 370/395.62 |
| 5,844,600 A * | 12/1998 | Kerr | ......................... | 348/14.12 |
| 5,982,828 A * | 11/1999 | Fujimori et al. | ............. | 375/356 |
| 6,148,051 A * | 11/2000 | Fujimori et al. | ............. | 375/356 |
| 6,272,131 B1 * | 8/2001 | Ofek | .......................... | 370/389 |
| 6,301,243 B1 * | 10/2001 | Copper et al. | ............... | 370/349 |
| 6,357,007 B1 * | 3/2002 | Cromer et al. | .............. | 713/194 |
| 6,404,711 B1 * | 6/2002 | Kato | ........................ | 369/47.31 |
| 6,473,628 B1 * | 10/2002 | Kuno et al. | .................. | 455/566 |
| 6,570,945 B1 * | 5/2003 | Ono et al. | .................... | 375/359 |
| 6,633,578 B1 * | 10/2003 | Matsumaru et al. | ......... | 370/419 |
| 6,721,338 B1 | 4/2004 | Sato | | |

(Continued)

FOREIGN PATENT DOCUMENTS

JP 09-046376 A 2/1997

(Continued)

OTHER PUBLICATIONS

Hoffman et al.; RTP Payload Format for MPEG1/MPEG2 Video; Network Working Group, The Internet Society; (1998) RFC2250; Jan. 1998.

*Primary Examiner*—Chi H. Pham
*Assistant Examiner*—Kevin Mew
(74) *Attorney, Agent, or Firm*—Panitch Schwarze Belisario & Nadel LLP

(57) ABSTRACT

A wireless communication apparatus is provided which is capable of performing synchronous transmission of a stream such as a video signal and therefore performing high-quality video transmission. The sending side generates time information based on a count of a beacon timer, adds the time information to a data packet of a video signal and sends the data packet. The receiving side, using PLL based on a timer count contained in a beacon, generates a clock having a higher frequency every time a beacon signal is received. The receiving side counts the clocks and accordingly generates new time information. This time information is compared with the time information added to the received data packet of the video signal, and the data packet is outputted only when the two match with each other.

23 Claims, 14 Drawing Sheets

U.S. PATENT DOCUMENTS

| | | | |
|---|---|---|---|
| 6,771,612 B1 * | 8/2004 | Park | 370/276 |
| 6,804,205 B1 * | 10/2004 | Nishimura et al. | 370/296 |
| 6,816,492 B1 * | 11/2004 | Turner et al. | 370/394 |
| 6,940,855 B2 * | 9/2005 | Okamura | 370/389 |
| 6,956,869 B1 * | 10/2005 | Kato | 370/468 |
| 7,123,306 B1 * | 10/2006 | Goto et al. | 348/474 |
| 7,272,361 B2 * | 9/2007 | Kawai et al. | 455/69 |
| 7,483,451 B2 * | 1/2009 | Lockridge et al. | 370/509 |
| 2001/0004366 A1 * | 6/2001 | Matsumura et al. | 370/509 |
| 2005/0025186 A1 * | 2/2005 | Morinaga et al. | 370/474 |
| 2005/0163156 A1 * | 7/2005 | Takeda et al. | 370/468 |

FOREIGN PATENT DOCUMENTS

| | | |
|---|---|---|
| JP | 11-308271 A | 11/1999 |
| JP | 2000-244523 A | 9/2000 |
| JP | 2000-244598 A | 9/2000 |
| JP | 2000244437 A | 9/2000 |
| JP | 2000-332852 A | 11/2000 |
| JP | 2001045092 A | 2/2001 |

* cited by examiner

FIG. 14
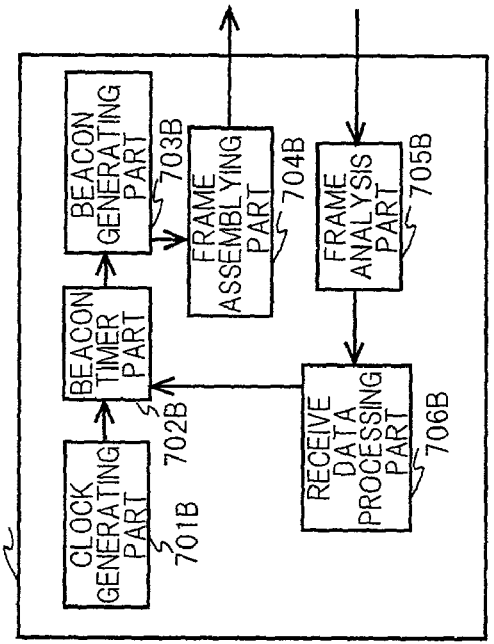
(B)
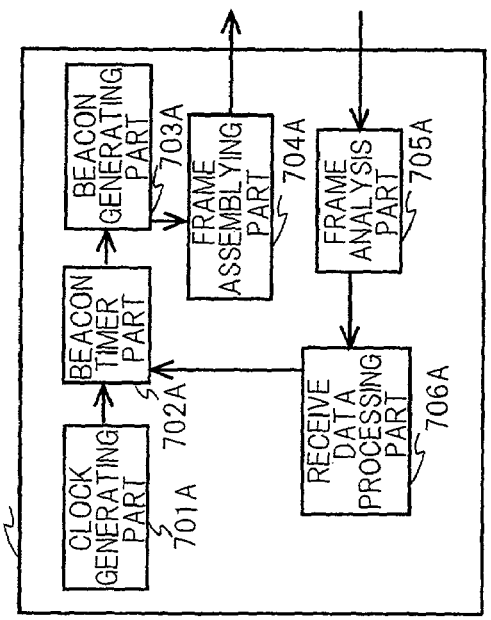
(A)

WIRELESS COMMUNICATION APPARATUS

BACKGROUND OF THE INVENTION

The present invention relates to a wireless communication apparatus which transmits or receives a video signal, a sound signal-and the like on a radio line, and more particularly, a wireless communication apparatus which ensures synchronicity of a signal to be transmitted between the sending side and the receiving side via an asynchronous radio transmission line.

The recent years have seen an increasingly popular use of a wireless local area network (hereinafter referred to as an "LAN"), which typically is IEEE802.11, instead of a conventional wired LAN such as the Ethernet, etc., owing to advantages of a wireless LAN such as the higher degree of freedom regarding the installation locations of equipment. Meanwhile, a wireless communication apparatus which transmits or receives a video signal, a sound signal and the like using a wireless LAN is becoming popular. A conventional wireless communication apparatus will now be described below.

FIG. 12 is a block diagram showing the structure of a conventional wireless communication apparatus. In FIG. 12, denoted at 10A is a first wireless communication unit which encodes and modulates a received video signal and sends the video signal as an electric wave having a predetermined format, and denoted at 10B is a second wireless communication unit which receives, demodulates and decodes the electric wave and outputs a video signal.

The first wireless communication unit 10A comprises a video signal encoding part 400A, a communication protocol processing part 600A, a MAC (Media Access Control) processing part 700A, an RF part 800A, and an antenna 30A, and is connected with the second wireless communication unit 10B via a radio line.

The second wireless communication unit 10B comprises a video signal decoding part 500B, a communication protocol processing part 600B, a MAC processing part 700B, an RF part 800B, and an antenna 30B.

Although the first wireless communication unit 10A and the second wireless communication unit 10B are both capable of performing bidirectional communications, for the simplicity of illustration, FIG. 12 shows a transmission path in only one direction.

FIG. 13 is a timing chart showing the timing of signals which are sent onto the radio line.

FIG. 14 is a block diagram showing the internal structures of the MAC processing part 700A of the first wireless communication unit 10A and the MAC processing part 700B of the second wireless communication unit 10B.

In the section (A) in FIG. 14, denoted at 704A is a frame assembling part, denoted at 701A is a clock generating part, denoted at 702A is a beacon timer part, denoted at 703A is a beacon generating part, denoted at 705A is a frame analysis part, and denoted at 706A is a receive data processing part.

In the section (B) in FIG. 14, denoted at 704B is a frame assembling part, denoted at 701B is a clock generating part, denoted at 702B is a beacon timer part, denoted at 703B is a beacon generating part, denoted at 705B is a frame analyzer, and denoted at 706B is a receive data processing part.

Operations of the conventional wireless communication apparatus having such a structure as above will now be described.

First, operations of the first wireless communication unit 10A will be described. A video signal is fed to the first wireless communication unit 10A from outside. The video signal encoding part 400A compresses the inputted video signal into a predetermined format and accordingly encodes the video signal. For transmission of a video signal, the video signal is encoded using the MPEG2-TS format in general for the purpose of reducing the amount of transmission data, transmission of clock information, etc. Thus encoded video signal is assembled into a packet in the MPEG2-TS format.

The MPEG2-TS packet is supplied to the communication protocol processing part 600A, whereby the MPEG2-TS packet is further assembled into a packet based on a predetermined communication protocol and a necessary header is added to this packet. TCP/IP for realizing reliable data transmission, UDP/IP which is suitable to transmission of stream data or the like may be used as this communication protocol, so that the MPEG2-TS packet is assembled into a packet of the IP packet format.

The IP packet is fed to the MAC processing part 700A, to be thereby assembled into a MAC packet based on a predetermined wireless communication scheme. As the structure of the MAC packet, the scheme defined by wireless LAN standards such as IEEE802.11, etc. is used.

The data assembled into the MAC packet format are supplied to the RF part 800A. The RF part 800A executes predetermined modulation and sends out via the antenna 30A the data as an electric wave which has a predetermined frequency. As the modulation method, quadrature modulation and spectrum diffusion or OFDM, etc. are used. The frequency may be the 2.4G band, 5G band, etc. Thus inputted video signal is sent to the radio communication line by a predetermined method.

Operations of the second wireless communication unit 10B shown in FIG. 12 will be now described. In the second wireless communication unit 10B, the electric wave (data) received at the antenna 30B is supplied to the RF part 800B.

The RF part 800B selects a desired frequency, demodulates and converts the receive data into a baseband signal, namely, data of the MAC packet format, and outputs the data to the MAC processing part 700B.

The MAC processing part 700B analyzes thus inputted data of the MAC packet format, converts the data into an IP packet and outputs the IP packet to the communication protocol processing part 600B.

The communication protocol processing part 600B extracts an MPEG2-TS packet from the received IP packet and outputs the MPEG2-TS packet to the video signal decoding part 500B.

The video signal decoding part 500B decodes the received MPEG2-TS packet, decompresses the packet and outputs the packet as a video signal. In this manner, the video signal received from the first wireless communication unit 10A is transmitted to the second wireless communication unit 10B via the radio communication line, decoded and decompressed in the second wireless communication unit 10B, and outputted to outside.

The timing of signals which are sent onto the radio line will now be describe with reference to FIG. 13. In FIG. 13, a beacon is a control signal from the first wireless communication unit 10A, and is transmitted in constant intervals (cycles) of from about a few milliseconds to 1 second. The beacons contain control information such as an identification number for identifying the first wireless communication unit 10A and the count of a timer which is disposed inside the first wireless communication unit 10A.

The beacons are used for the purpose of allowing the second wireless communication unit 10B to identify the first wireless communication unit 10A based on the identification number which is contained in the beacons, for the purpose of adjusting the timing of sending and receiving on the part of the first wireless communication unit 10A and the second wireless communication unit 10B based on the timing at which the beacons are outputted, for the purpose of matching an internal timer of the second wireless communication unit 10B with the timer count of the first wireless communication unit 10A contained in the beacons so that the second wireless communication unit 10B intermittently performs a receiving operation only at beacon receiving timing thereby saving electric power when it is not necessary to transfer video data between the first wireless communication unit 10A and the second wireless communication unit 10B, and for other purposes.

Video data are sent out at timing between two neighboring beacons. IEEE802.11 uses the CSMA/CA scheme. Control according to this scheme requires, for sending of data, to receive data first, confirm whether a radio line is unoccupied, i.e., whether other wireless communication apparatus is sending data to the radio line, and send data if the radio line is unoccupied but confirm that sending from the other wireless communication apparatus ended and thereafter send the data.

Hence, in the event that there are a plurality of second wireless communication units 10B, when the radio line is being used for other communication, sending has to wait until sending of the signal for the other communication completes and the radio line becomes available. Depending on the state of use of the radio line, this sometimes delays transmission.

With reference to FIG. 14, explanation will now be given on an operation in which the first wireless communication unit 10A sends the beacons, the second wireless communication unit 10B receives the beacons and the internal timer of the first wireless communication unit 10A and the internal timer of the second wireless communication. unit 10B are synchronized to each other.

Sending and receiving of the beacons is performed by the MAC processing part 700A of the first wireless communication unit 10A and the MAC processing part 700B of the second wireless communication unit 10B.

First, an operation that the first wireless communication unit 10A sends the beacons will be described. The clock generating part 701A generates a clock signal which is for creating the timing at which the beacons are to be sent out, and outputs the clock signal to the beacon timer part 702A.

The beacon timer part 702A counts the clock signal. The beacon timer part 702A is comprised of a counter having approximately 64 bits for instance or the like.

Referring to the count (timer count) outputted from the beacon timer part 702A and upon detection that the timer count changed to a predetermined value, the beacon generating part 703A outputs to the frame assembling part 704A control information which is contained in the beacons, namely, the identification number for identifying the first wireless communication unit 10A and the timer count outputted from the beacon timer part 702A. The predetermined value is a value which is determined by a relationship with the clock signal of the clock generating part 701A, and desired beacon sending cycle is set in accordance with this value. The frame assembling part 704A stores the control information in a predetermined MAC frame and outputs the same to the RF part 800A. In this manner, a beacon signal in which the control information is stored in a predetermined cycle is sent out.

An operation that the second wireless communication unit 10B receives the beacons will now be described.

The frame content of the received signal outputted from the RF part 800B is analyzed by the frame analysis 705B in the second wireless communication unit 10B, whereby whether this signal is addressed to the second wireless communication unit 10B is judged. This signal is discarded when this signal is not addressed to the second wireless communication unit 10B, whereas when this signal is addressed to the second wireless communication unit 10B, the receive data are outputted to the receive data processing part 706B.

The receive data processing part 706B, when the receive data are the beacons, extracts the control information which is contained in the beacons, extracts information regarding the timer count from the control information, and outputs the information to the beacon timer part 702B. This timer count is the count of the timer of the first wireless communication unit 10A stored in the beacons by the first wireless communication unit 10A.

The beacon timer part 702B of the second wireless communication unit 10B counts the clock signal outputted from the clock generating part 701B, similarly to the beacon timer part 702A of the first wireless communication unit 10A. A difference from the first wireless communication unit 10A is that the count of the beacon timer part 702B of the second wireless communication unit 10B is rewritten by the timer count which is outputted from the receive data processing part 706B. The rewriting matches the count of the beacon timer part 702A of the first wireless communication unit 10A with the count of the beacon timer part 702B of the second wireless communication unit 10B.

For every receipt of the beacon, the count of the beacon timer part 702B of the second wireless communication unit 10B is rewritten by the timer count of the first wireless communication unit 10A contained in the received beacon, whereby the internal timer of the first wireless communication unit 10A and the internal timer of the second wireless communication unit 10B are synchronized to each other.

Since the internal timer of the first wireless communication unit 10A and the internal timer of the second wireless communication unit 10B are synchronized to each other, operations of the second wireless communication unit 10B can be controlled in such a manner that the second wireless communication unit 10B performs a receiving operation only at the timing that the first wireless communication unit 10A sends out the beacons but otherwise stops performing this operation, which reduces consumption power.

The conventional wireless communication apparatus has such a structure as described above and is convenient in that it is possible to supply video signals from the first wireless communication unit 10A to the second wireless communication unit 10B without installing a new wired transmission line. However, due to an influence of a change in communication state and propagation delay, delay in communication protocol processing and the like which are unique to a radio line, there are some cases that a video signal reproduced in the second wireless communication unit 10B cannot be reproduced normally.

While video signals are transmitted in the MPEG2-TS format, during transmission of MPEG2-TS packets via a radio line, but for accurate reproduction of the timing at which the video signal encoding part 400A outputs an MPEG2-TS packet and the timing at which the video signal decoding part 500B receives an MPEG2-TS packet, a video signal cannot. be reproduced normally on the receiving side.

This is because an MPEG2-TS packet contains clock information which serves as a reference clock for decoding and therefore a correct reference clock can not be reproduced unless transmitted at the correct timing.

However, in the case of the wireless communication apparatus having such a structure, a processing delay time at the communication protocol processing part sometimes becomes short or long.

Although the processing performed in the communication protocol processing part requires an extremely complex configuration if to be realized by hardware, and therefore is realized by software using a CPU and the like, it is difficult to ensure that a processing time has a constant value in processing realized by software.

In addition, when a radio communication line is used, since a propagation path does not remain constant but changes because of reflection of an electric wave by a surrounding structure or for other reasons, a processing delay time changes.

Further, when the quality deteriorates due to jamming or interference from other wireless communication apparatus, the MAC processing part executes complementary processing such as to detect an error in data to be transmitted and to resend the data. In this case, since data transmitted once again are re-sent later, a long delay time is created.

Hence, in this case, there is a problem that the output timing of an MPEG2-TS packet from the video signal encoding part 400A fails to be accurately reproduced upon arrival at the video signal decoding part 500B so that a video signal cannot be reproduced normally on the receiving side.

BRIEF SUMMARY OF THE INVENTION

The present invention has been made to solve such problems described above, and accordingly, aims at providing a wireless communication apparatus which is capable of reproducing a video signal at correct timing even despite a change in delay time due to processing using a communication protocol, a change in transmission delay time caused by the state of a radio line, etc.

To attain the object, a wireless communication apparatus according to the present invention is a first wireless communication unit, which transmits a video signal as packet data between the first wireless communication unit and a second wireless communication unit connected on a radio line, comprises: a time information generating part which generates first time information; a time information sending part which intermittently sends the first time information in a predetermined cycle; and a time information adding part which adds the first time information or time information which is obtained based on the first time information to a data packet of a video signal which is to be sent. Hence, it is possible to add the time information of the first wireless communication unit to the data packet of the video signal and then send the data packet to the second wireless communication unit.

A wireless communication apparatus according to a different aspect of the present invention is a second wireless communication unit, which receives a video signal as packet data transmitted between the second wireless communication unit and a first wireless communication unit which are connected on a radio line, comprises: a first PLL part which receives first time information intermittently sent from the first wireless communication unit in a predetermined cycle and generates second time information which reproduces the first time information; and a first time information comparing part which compares the second time information with time information which is added to a data packet of the video signal transmitted from the first wireless communication unit (hereinafter referred to as a "receive data packet") and controls the output timing of outputting the receive data packet in accordance with a result of the comparison. Hence, it is possible to output the receive data packet from the second wireless communication unit at the timing which is based on the time information which is added to the data packet of the video signal by the first wireless communication unit.

According to a different aspect of the present invention, the first wireless communication unit comprises a second PLL part which generates more accurate time information than the first time information based on the first time information; and said time information adding part adds time information generated by the second PLL part to a data packet of a video signal which is to be sent. Hence, the time information which is added to the data packet of the video signal by the first wireless communication unit is more accurate.

A wireless communication apparatus according to a different aspect of the present invention comprises the first wireless communication unit described above and the second wireless communication unit described above. Hence, synchronous transmission of a stream such as a video signal is possible between the first wireless communication unit above and the second wireless communication unit above.

According to a different aspect of the present invention, the second wireless communication unit re-sends at least said time information, which is added to a data packet of a video signal, to the first wireless communication unit. This allows the first wireless communication unit to obtain time information which is needed for data transmission. The second wireless communication unit may re-send, for example, a receive data packet, to which said time information is added, time information with a data packet ID code, or only the time information.

According to a different aspect of the present invention, the first wireless communication unit further comprises: a second time information comparing part which compares time information which is re-sent from the second wireless communication unit with the first time information or time information which is obtained based on the first time information; and a first offset calculating part which calculates an offset value based on a result of the comparison executed by the second time information comparing part, and generates time information which is obtained by correcting, with the offset value, the first time information or the time information which is obtained based on the first time information. The time information adding part adds time information generated by the first offset calculating part to a data packet of a video signal which is to be sent. Hence, utilizing a data transmission time for data transmission between the first wireless communication unit and the second wireless communication unit, the time information which is added to the data packet of the video signal can be corrected.

A wireless communication apparatus according to a different aspect of the present invention comprises the first wireless communication unit described above and the second wireless communication unit described above. Hence, between the first wireless communication unit and the second wireless communication unit, synchronous transmission of a stream such as a video signal is possible which is less susceptible to a change in data transmission time.

According to a different aspect of the present invention, the second wireless communication unit further comprises: a receive data buffer part which temporarily holds a receive data packet until outputting the receive data packet; and a receive data size detecting part which detects the size of the receive data packet which is held in the receive data buffer part (hereinafter referred to as a "receive data size"). The second wireless communication unit sends, to the first wireless communication unit, receive data buffer information which contains at least either one of the receive data size detected by the receive data size detecting part and a result of comparison between the receive data size and a reference data size which is set in advance. This allows the first wireless communication unit to obtain information regarding the state of the receive data buffer of the second wireless communication unit.

According to a different aspect of the present invention, the first wireless communication unit further comprises a first offset calculating part: which calculates an offset value based on receive data buffer information which contains at least either one of the size of a receive data packet which is temporarily held in a receive data buffer part of the second wireless communication unit and a result of comparison between the receive data size and a reference data size which is set in advance; and which generates time information which is obtained by correcting, with the offset value, the first time information or time information which is obtained based on the first time information. Hence, it is possible to correct the time information which is added to the data packet of the video signal in accordance with the state of the receive data buffer of the second wireless communication unit.

A wireless communication apparatus according to a different aspect of the present invention comprises the first wireless communication unit described above and the second wireless communication unit described above. Hence, it is possible to prevent a situation like impossible outputting due to overflow of data in the receive data buffer of the second wireless communication unit or absence of the receive data packet.

According to a different aspect of the present invention, the second wireless communication unit further comprises: a receive data buffer part which temporarily holds a receive data packet until outputting the receive data packet; a receive data size detecting part which detects the receive data size of a receive data packet which is held in the receive data buffer part; and a second offset calculating part which calculates an offset value based on receive data buffer information which contains at least either one of a receive data size detected by the receive data size detecting part and a result of comparison between the receive data size and a reference data size which is set in advance. The first time information comparing part compares time information which is obtained by correcting the second time information with the offset value with time information which is added to the receive data packet, and controls the output timing of outputting the receive data packet in accordance with a result of the comparison. Hence, it is possible to prevent a situation like impossible outputting due to overflow of data in the receive data buffer of the second wireless communication unit or absence of the receive data packet.

According to a different aspect of the present invention, the second wireless communication unit further comprises: a receive error frequency detecting part which detects a frequency at which receive data become an error; and a second offset calculating part which calculates an offset value based on the receive error frequency detected by the receive error frequency detecting part. The first time information comparing part compares time information which is obtained by correcting the second time information with the offset value with time information which is added to the receive data packet, and controls the output timing of outputting the receive data packet in accordance with a result of the comparison. Hence, between the first wireless communication unit and the second wireless communication unit, synchronous transmission of a stream such as a video signal is possible which is less susceptible to a change in propagation state over a radio line.

According to a different aspect of the present invention, the second wireless communication unit further comprises: a receive field intensity measuring part which measures a receive field intensity value; and a second offset calculating part which calculates an offset value based on a receive field intensity value measured by the receive field intensity measuring part. The first time information comparing part compares time information which is obtained by correcting the second time information with the offset value with time information which is added to the receive data packet, and controls the output timing of outputting the receive data packet in accordance with a result of the comparison. Hence, between the first wireless communication unit and the second wireless communication unit, synchronous transmission of a stream such as a video signal is possible which is less susceptible to a change in propagation state over a radio line.

According to a different aspect of the present invention, the first wireless communication unit further comprises a sending cycle setting part which changes a sending cycle of the time information sending part. Hence, it is possible to adjust a period of time required until the first wireless communication unit becomes ready to transmit a stream to the second wireless communication unit.

According to a different aspect of the present invention, the second wireless communication unit further comprises a PLL lock-up detecting part which detects locking-up of the first PLL part and generates PLL lock-up information which is indicative of the locking-up of the first PLL part, and the first wireless communication unit is notified of the PLL lock-up information. This allows the first wireless communication unit to obtain information regarding the state of the PLL of the second wireless communication unit.

According to a different aspect of the present invention, in the first wireless communication unit, the sending cycle setting part changes the sending cycle of the time information sending part based on PLL lock-up information which is sent from the second wireless communication unit and indicative of locking-up of the first PLL part. Hence, it is possible to adjust a period of time required until the first wireless communication unit becomes ready to transmit a stream to the second wireless communication unit, in accordance with the state of the PLL of the second wireless communication unit.

A wireless communication apparatus according to a different aspect of the present invention comprises the first wireless communication unit described above and the second wireless communication unit described above. Hence, it is possible for the second wireless communication unit to receive a stream signal sent from the first wireless communication unit without fail.

According to a different aspect of the present invention, the second wireless communication unit further comprises a receive field intensity measuring part which measures a receive field intensity value, and the receive field intensity value is sent to the first wireless communication unit. This allows the first wireless communication unit to obtain the receive field intensity value of the second wireless communication unit.

According to a different aspect of the present invention, in the first wireless communication unit, the sending cycle setting part changes the sending cycle of the time information sending part based on a receive field intensity value of the second wireless communication unit sent from the second wireless communication unit. Hence, it is possible to adjust the sending cycle of the first wireless communication unit, in accordance with the receive field intensity value.

A wireless communication apparatus according to a different aspect of the present invention comprises the first wireless communication unit described above and the second wireless communication unit described above. Hence, when the receive field intensity is weak, shortening the beacon cycles realizes an improvement that the beacon cycles are missed less frequently and losing synchronization of PLL is prevented. Meanwhile, when the receive field intensity is strong, setting the beacon cycles long solves a problem of a lowered transmission throughput and energy consumption.

According to a different aspect of the present invention, the second wireless communication unit further comprises a receive error frequency detecting part which detects a frequency at which receive data become an error, and the receive error frequency detected by the receive error frequency detecting part is sent to the first wireless communication unit. This allows the first wireless communication unit to obtain the receive error frequency in the second wireless communication unit.

According to a different aspect of the present invention, in the first wireless communication unit, the sending cycle setting part changes the sending cycle of the time information sending part based on a receive error frequency of the second wireless communication unit sent from the second wireless communication unit. Hence, it is possible to adjust the sending cycle of the first wireless communication unit, in accordance with the receive error frequency.

A wireless communication apparatus according to a different aspect of the present invention comprises the first wireless communication unit described above and the second wireless communication unit described above. Hence, when the receive error frequency is high, shortening the beacon cycles realizes an improvement that the beacon cycles are missed less frequently and losing synchronization of PLL is prevented. Meanwhile, when the receive error frequency is low, setting the beacon cycles long solves a problem of a lowered transmission throughput and energy consumption.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 14 is a block diagram showing the internal structures of MAC processing parts.

It will be recognized that some or all of the Figures are schematic representations for purposes of illustration and do not necessarily depict the actual relative sizes or locations of the elements shown.

DETAILED DESCRIPTION OF THE INVENTION

Embodiments of a wireless communication apparatus according to the present invention will now be described with reference to the associated drawings.

First Embodiment

Figure 1:
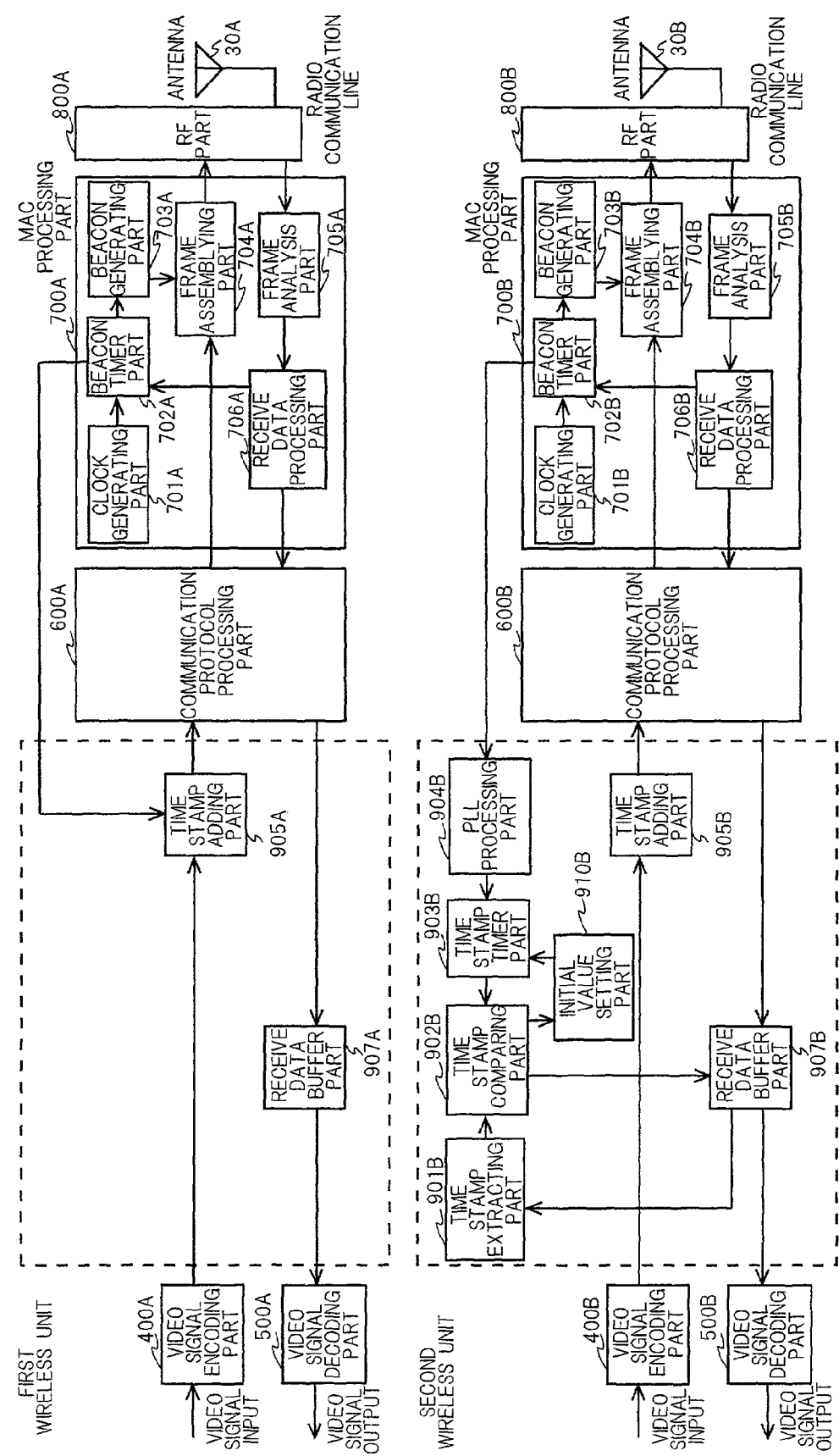
FIG. 1 is a block diagram showing the structure of a wireless communication apparatus according to a first embodiment of the invention.

FIG. 1 is a block diagram showing the structure of a wireless communication apparatus according to a first embodiment of the invention.

In FIG. 1, a first wireless communication unit 10A is a first wireless communication unit and a second wireless communication unit 10B is a second wireless communication unit.

In the first wireless communication unit 10A, a clock generating part 701A and a beacon timer part 702A form a time information generating part. A beacon generating part 703A, a frame assembling part 704A and an RF part 800A form a time information sending part (The frame assembling part 704A and the RF part 800A also serve as a packet data sending part for video signals.). A time stamp adding part 905A forms a time information adding part.

In the second wireless communication unit 10B, a PLL processing part 904B and a time stamp timer part 903B form a first PLL part. A time stamp comparing part 902B forms a first time information comparing part.

Figure 12:
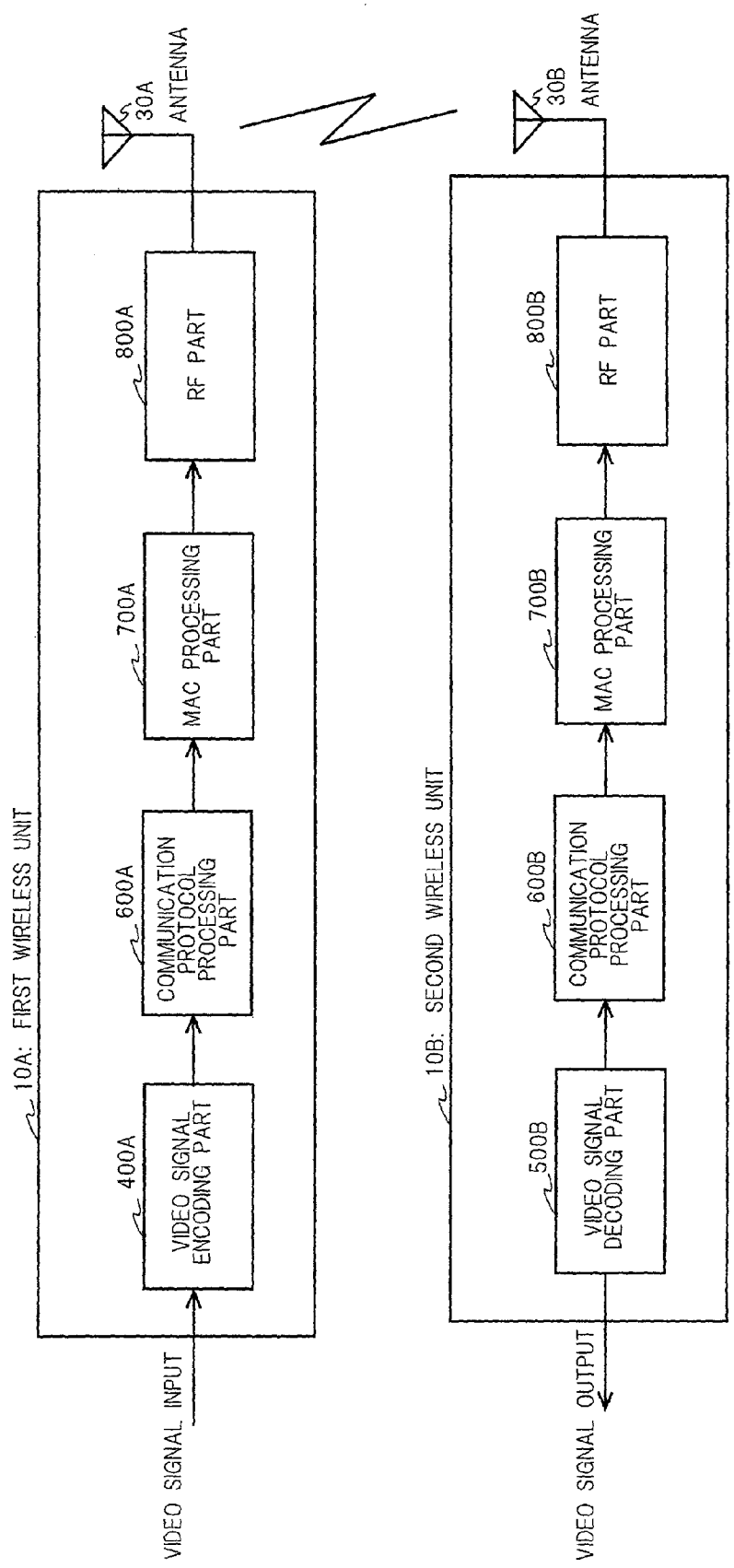
FIG. 12 is a block diagram showing the structure of a conventional wireless communication apparatus.
Figure 13:
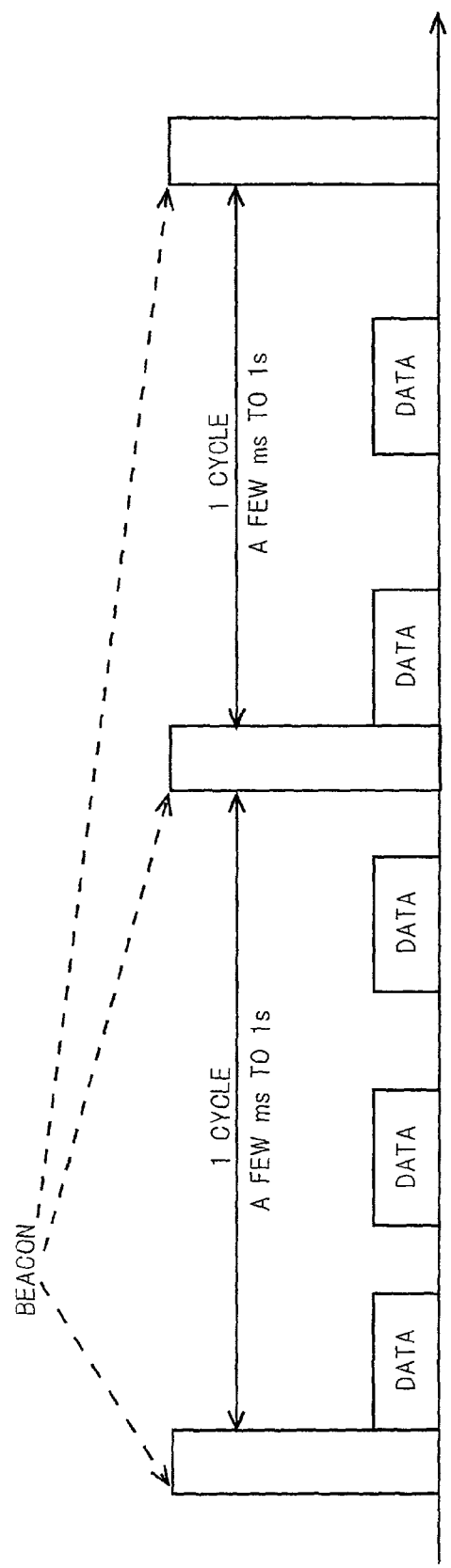
FIG. 13 is a timing chart showing the timing of signals which are sent onto a radio line.

Portions which are the same or correspond to those of the conventional wireless communication apparatus (shown in FIG. 12 and FIG. 14) are denoted at the same reference symbols.

In the wireless communication apparatus according to the first embodiment, the time stamp adding part 905A and a receive data buffer part 907A are newly added to the first wireless communication unit 10A, and a time stamp extracting part 901B, the time stamp comparing part 902B, the time stamp timer part 903B, the PLL processing part 904B, a time stamp adding part 905B, a receive data buffer part 907B and an initial value setting part 910B are newly added to the second wireless communication unit 10B.

The wireless communication apparatus according to the first embodiment having such a structure as above performs a different operation from that according to the conventional technique, in which a video signal to be transmitted on the sending side is sent together with a time stamp which is added to the video signal and using the time stamp, the video signal is reproduced on the receiving side in synchronization to the transmission timing. Operations of the wireless communication apparatus according to the first embodiment will now be described.

First, explanation will now be given on an operation in which a time stamp is added to an MPEG2-TS packet which is outputted from the video signal encoding part 400A in the first wireless communication unit 10A.

Time information outputted from the beacon timer part 702A are fed to the time stamp adding part 905A. The time information is a count which represents a clock which is outputted from the clock generating part 701A and counted by the beacon timer part 702A. As an MPEG2-TS packet outputted from the video signal encoding part 400A is supplied to the time stamp adding part 905A, the time stamp adding part 905A adds the time information outputted from the beacon timer part 702A at that point to this MPEG2-TS packet and outputs the packet to the communication protocol processing part 600A.

The wireless communication apparatus according to the first embodiment assumes a time axis which uses the time information outputted from the beacon timer part 702A as a reference. The time information is added as a time stamp, at the timing at which the video signal encoding part 400A outputs the MPEG2-TS packet.

In this manner, using the timing at which the video signal encoding part 400A outputs the MPEG2-TS packet as the reference, the time information outputted from the beacon timer part 702A is added to the MPEG2-TS packet as the time stamp.

The MPEG2-TS packet added with the time stamp supplied to the communication protocol processing part 600A is outputted at the antenna 30A onto a radio communication line through a similar operation to that described earlier in relation to the conventional technique.

Explanation will now be given on an operation in which time information matching with the time information outputted from the beacon timer part 702A of the first wireless communication unit 10A is generated in the second wireless communication unit 10B.

The beacon timer part 702B of the second wireless communication unit 10B outputs time information which is generated by counting the clock outputted from the clock generating part 701B and is regularly set up again by the time information of the first wireless communication unit 10A which is contained in the beacons which are regularly outputted by the first wireless communication unit 10A (which is the same as in the conventional technique). This time information is fed to the PLL processing part 904B.

Due to a difference in accuracy between the clock outputted from the clock generating part 701A of the first wireless communication unit 10A and the clock outputted from the clock generating part 701B of the second wireless communication unit 10B, an error is created between the two clocks.

As the time information is set up again by the beacon, the time information may become discontinuous because of the re-set timing.

Based on the received time information, the PLL processing part 904B generates new clocks. Thus generated clocks serve as continuous time information. In addition, since the time information transmitted owing to the beacons from the first wireless communication unit 10A is also inputted, thus generated clocks coincide with the clocks which are outputted from the clock generating part 701A of the first wireless communication unit 10A.

The clocks outputted from the PLL processing part 904B are fed to the time stamp timer part 903B which will then count the supplied clocks and accordingly output new time information. This time information as well matches with the time information which is outputted from the beacon timer part 702A of the first wireless communication unit 10A.

Now, explanation will now be given on an operation in which the MPEG2-TS packet received by the second wireless communication unit 10B is outputted to the video signal decoding part 500B in synchronization to the output timing of the video signal encoding part 400A of the first wireless communication unit 10A.

The video signal sent out from the first wireless communication unit 10A, after supplied to the antenna 30B of the second wireless communication unit 10B, is outputted from the communication protocol processing part 600B through a similar operation to that described earlier in relation to the conventional technique. The data outputted at this stage are the MPEG2-TS packet to which the time stamp was added by the time stamp adding part 905A on the sending side.

The data outputted from the communication protocol processing part 600B are fed to the receive data buffer part 907B. The receive data buffer part 907B outputs the receive data to the time stamp extracting part 901B.

The time stamp extracting part 901B extracts the time stamp from the receive data and outputs the same to the time stamp comparing part 902B.

The time stamp comparing part 902B compares the time stamp of the receive data with the time information outputted from the time stamp timer part 903B, and only when the two match with each other, outputs a control signal which permits outputting to the receive data buffer part 907B.

Upon receipt of this control signal, the receive data buffer part 907B outputs to the video signal decoding part 500B the MPEG2-TS packet which is the receive data from which the time stamp was removed.

Next, re-setting of a time stamp by the second wireless communication unit 10B (time information generated by the time stamp timer part 903B of the second wireless communication unit 10B) will be described.

The time stamp comparing part 902B outputs the time stamp extracted by the time stamp extracting part 901B to the initial value setting part 910B. Using this time stamp, the initial value setting part 910B sets the time stamp of the second wireless communication unit 10B once again.

In short, the time information (the clock count of the clocks outputted from the PLL processing part 904B) generated by the time stamp timer part 903B is set up once gain using the current time stamp of the first wireless communication unit 10A, whereby the time stamps of the first wireless communication unit 10A and the second wireless communication unit 10B are synchronized to each other.

For instance, assume that the time stamp of the first wireless communication unit 10A is "1000", the time needed for communication between the first wireless communication unit 10A and the second wireless communication unit 10B is "10", and the time stamp of the second wireless communication unit 10B is "2000". That is, the time stamps of the first wireless communication unit 10A and the second wireless communication unit 10B are currently "1000" and "2000" which are different from each other.

At the time of receipt of data from the first wireless communication unit 10A by the second wireless communication unit 10B, the time stamps of the first wireless communication unit 10A and the second wireless communication unit 10B must be counted up respectively to "1010" and "2010". Now, it is assumed that the time stamp of the second wireless. communication unit 10B is set again using the time stamp "1000" of the first wireless communication unit 10A received by the second wireless communication unit 10B.

With setup requiring to send data when the time stamp of the first wireless communication unit 10A is "1015", the time stamp of the second wireless communication unit 10B is "1000" when the time stamp of the first wireless communication unit 10A is "1010" but is "1005" when the time stamp of the first wireless communication unit 10A is "1015". In other words, data are outputted from the second wireless communication unit 10B upon arrival at "1015" which is the time after the delay (i.e., the time needed for communication) "10" of data from the first wireless communication unit 10A to the second wireless communication unit 10B.

But for re-setting of the time stamp regarding the second wireless communication unit 10B, the time stamp of the second wireless communication unit 10B is "2015" when the time stamp of the first wireless communication unit 10A is "1015", and therefore, even despite an instruction for data transmission with the time stamp "1015", data will not be transmitted. Hence, it is necessary to match the time stamps of the first wireless communication unit 10A and the second wireless communication unit 10B with each other in advance.

Thus, the time information outputted by the time stamp timer part 903B matches with the time information outputted from the beacon timer part 702A of the first wireless communication unit 10A.

As described above, outputted to the video signal decoding part 500B based on the time stamp which is added to the receive data, the MPEG2-TS packet is received by the video signal decoding part 500B at the same timing as outputting of the MPEG2-TS packet from the video signal encoding part 400A of the first wireless communication unit 10A.

Second Embodiment

Figure 2:
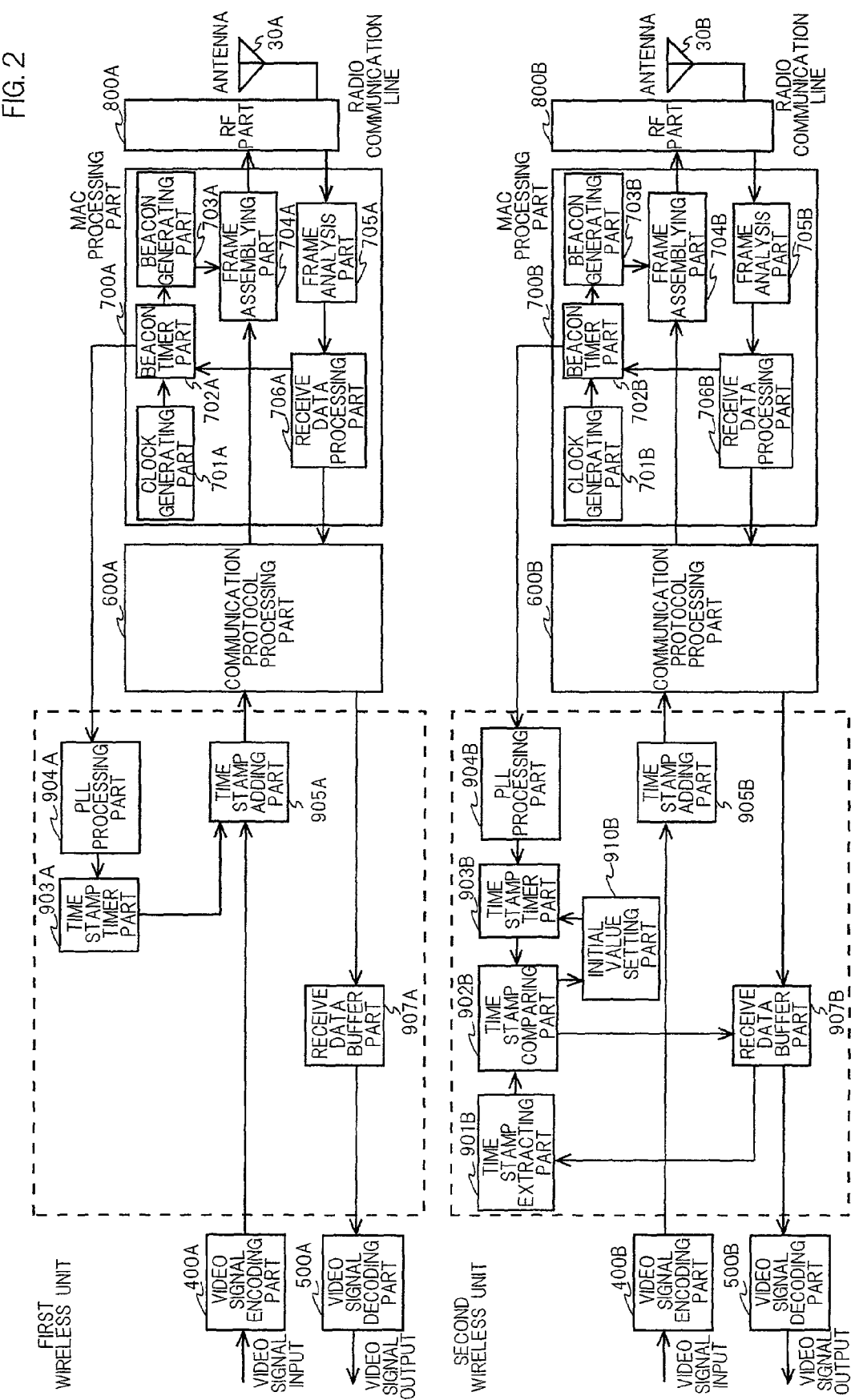
FIG. 2 is a block diagram showing the structure of a wireless communication apparatus according to a second embodiment of the invention.

FIG. 2 is a block diagram showing the structure of a wireless communication apparatus according to a second embodiment.

In FIG. 2, the PLL processing part 904A and a time stamp timer part 903A of the first wireless communication unit 10A form a second PLL part.

Portions which are the same or correspond to those of the wireless communication apparatus according to the first embodiment (FIG. 1) are denoted at the same reference symbols.

In the wireless communication apparatus according to the second embodiment, the time stamp timer part 903A and the PLL processing part 904A are newly added to the first wireless communication unit 10A.

Operations of the wireless communication apparatus according to the second embodiment having such a structure which are different from the operations according to the conventional technique will now be described.

First, explanation will now be given on an operation in which time information for time stamp having a higher accuracy of time is generated from time information outputted from the beacon timer part 702A in the first wireless communication unit 10A. In a wireless communication apparatus complying with IEEE802.11, the accuracy of time information outputted from the beacon timer part 702A is 1 microsecond. On the other hand, a clock used for MPEG2-TS is at 27 MHz, thus presenting a large difference in accuracy.

In the first wireless communication unit 10A, the PLL processing part 904A is for generating clocks having a higher frequency than that of time information outputted from the beacon timer part 702A. The PLL processing part 904A generates clocks at 27 MHz. The clocks outputted from the PLL processing part 904A are fed to the time stamp timer part 903A, and time information having the accuracy of 27 MHz is outputted to the time stamp adding part 905A.

The time stamp adding part 905A adds the time information outputted from the time stamp timer part 903A to an MPEG2-TS packet outputted from the video signal encoding part 400A, and outputs the packet to the communication protocol processing part 600A.

In this manner, added with the time information generated from the clocks at 27 MHz in compliance with the clocks generated by the clock generating part 701A, the MPEG2-TS packet is transmitted.

Next, explanation will now be given on an operation in which the MPEG2-TS packet received by the second wireless communication unit 10B is outputted to the video signal decoding part 500B in synchronization to the output timing of the video signal encoding part 400A of the first wireless communication unit 10A.

Although operations of the second wireless communication unit 10B are similar to the operations of the second wireless communication unit 10B according to the first embodiment, clocks generated by the PLL processing part 904B are different (The frequency of the clocks in the second embodiment is far higher than that used in the first embodiment.). The clocks generated in the second embodiment have the same frequency as that of the clocks generated by the PLL processing part 904A of the first wireless communication unit 10A. Further, these clocks are generated so as to stay in compliance with time information from the beacon timer part 702B, as in the first embodiment.

Hence, the time information outputted from the time stamp timer part 903A of the first wireless communication unit 10A matches with the time information outputted from the time stamp timer part 903B of the second wireless communication unit 10B. The timing of the MPEG2-TS packet inputted to the video signal decoding part 500B of the second wireless communication unit 10B therefore coincides with the timing at which the video signal encoding part 400A of the first wireless communication unit 10A outputs the MPEG2-TS packet, with a clock accuracy of 27 MHz (accuracy of about 0.037 microsecond).

Third Embodiment

Figure 3:
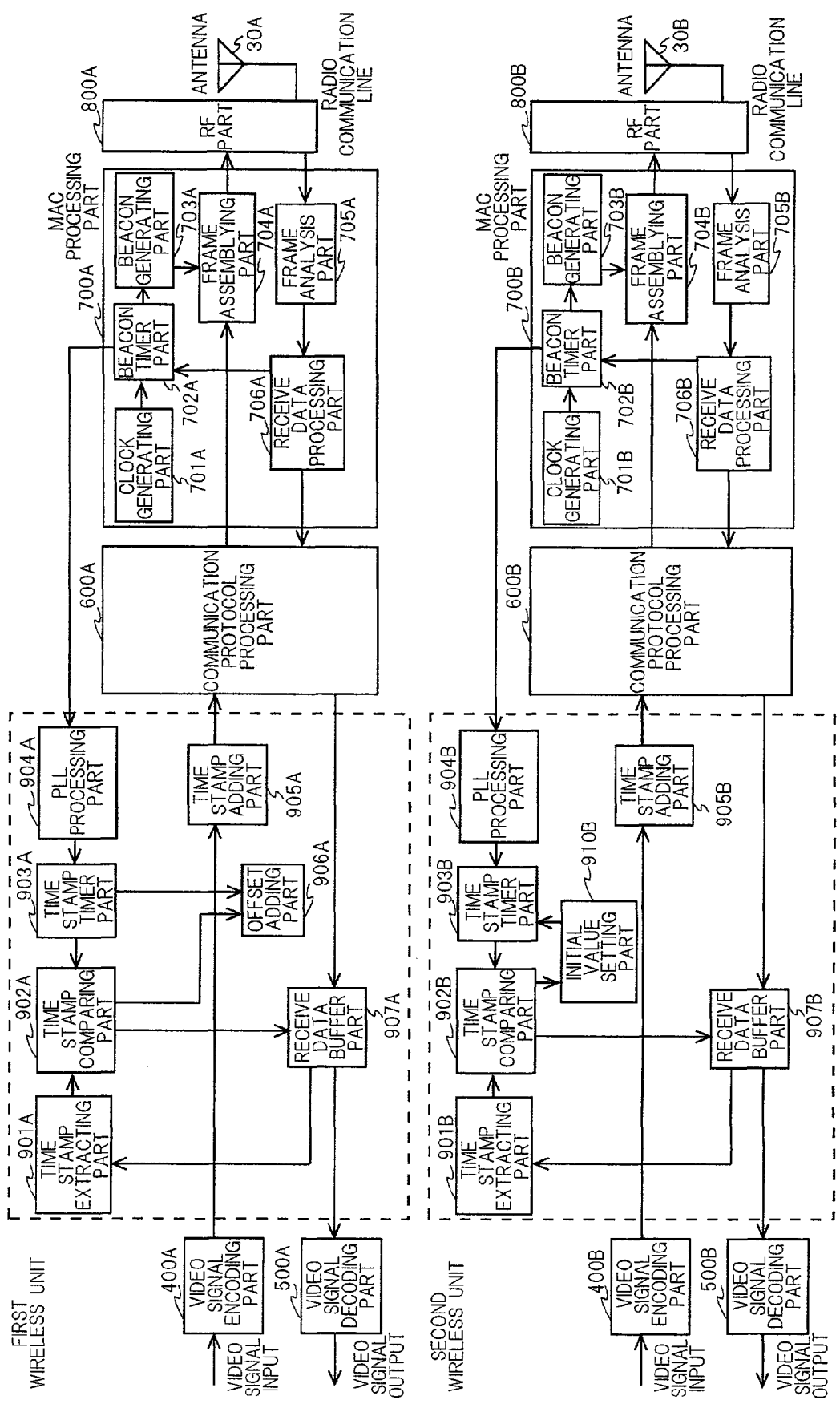
FIG. 3 is a block diagram showing the structure of a wireless communication apparatus according to a third embodiment of the invention.

FIG. 3 is a block diagram showing the structure of a wireless communication apparatus according to a third embodiment.

In FIG. 3, an offset adding part 906A of the first wireless communication unit 10A is a first offset calculating part, and a time stamp comparing part 902A is a second time information comparing part.

Portions which are the same or correspond to those of the wireless communication apparatus according to the first or the second embodiment (FIG. 1 or 2) are denoted at the same reference symbols.

In the wireless communication apparatus according to the third embodiment, a time stamp extracting part 901A, the time stamp comparing part 902A and the offset adding part 906A are newly added to the first wireless communication unit 10A.

The wireless communication apparatus according to the third embodiment having such a structure is characterized in comprising a function (addition of offset) of correcting, with the time needed for communication, a time stamp which is added to a video signal in the first wireless communication unit 10A.

Operations of the wireless communication apparatus according to the third embodiment will now be described.

First, data to which a time stamp is added in the first wireless communication unit 10A are sent, and received by the second wireless communication unit 10B via a radio communication line. The frame analyzer 705B of the second wireless communication unit 10B analyzes the receive data, and when the data are addressed to the second wireless communication unit 10B, outputs the receive data as they are to the frame assembling part 704B, so that the data are sent back to the first wireless communication unit 10A through the frame assembling part 704B and the RF part 800B.

The data sent originally from the first wireless communication unit 10A and thus returned from the second wireless communication unit 10B are supplied to the receive data buffer part 907A via the MAC processing part 700A and the communication protocol processing part 600A.

The receive data buffer part 907A outputs the receive data to the time stamp extracting part 901A. The time stamp extracting part 901A extracts the time stamp from the receive data and outputs the same to the time stamp comparing part 902A.

The time stamp comparing part 902A compares the time stamp of the receive data with the time information outputted from the time stamp timer part 903A. This allows to know a round-trip data transmission time between the first wireless communication unit 10A and the second wireless communication unit 10B. In short, since the time stamp outputted from the time stamp timer part 903A is the current time information and the time stamp outputted from the time stamp extracting part 901A is the time information upon outputting of the MPEG2-TS packet from the video signal encoding part 400A of the first wireless communication unit 10A, a difference between the time information from the time stamp timer part 903A and the time information from the time stamp extracting part 901A denotes the time needed to send and receive data.

The time stamp comparing part 902A outputs the comparison result (the difference in time information) to the offset adding part 906A.

The offset adding part 906A, based on the difference in time information, calculates an offset value. The offset adding part 906A corrects the calculated offset value with the time information outputted from the time stamp timer part 903A, accordingly generates a time stamp, and outputs the time stamp to the time stamp adding part 905A.

The time stamp adding part 905A adds the time stamp thus generated by the offset adding part 906A to the MPEG2-TS packet, and outputs the MPEG2-TS packet to the communication protocol processing part 600A.

The data sending/receiving time can be viewed as one of data which are effective for addition of an offset to the time information (time stamp) which is outputted from the time stamp timer part 903A.

For example, assume that "1015" and "1005" are the current time stamp outputted the time stamp timer part 903A of the first wireless communication unit 10A and the current time stamp outputted the time stamp timer part 903B of the second wireless communication unit 10B, respectively. At this stage, an offset value "10" is added to the time stamp from the first wireless communication unit 10A.

When the time stamp from the second wireless communication unit 10B is "1015", the receive data buffer part 907B of the second wireless communication unit 10B outputs an MPEG2-TS packet.

In the case that the time needed to send data from the first wireless communication unit 10A to the second wireless communication unit 10B is shorter than "10", data are accumulated in the receive data buffer part 907B of the second wireless communication unit 10B during a period since the time stamp from the second wireless communication unit 10B became "1005" until this time stamp becomes "1015".

If the amount of the data received by the second wireless communication unit 10B (total size) exceeds the buffer size of the receive data buffer part 907B before the time stamp from the second wireless communication unit 10B becomes "1015", this is buffer overflow.

This necessitates to appropriately adjust the offset value to a proper value but not to a fixed value using the data sending/receiving time described above.

Next, addition of an offset using the data sending/receiving time will be described.

It is assumed that the round-trip data transmission time between the first wireless communication unit 10A and the second wireless communication unit 10B which the first wireless communication unit 10A obtained from the time stamp comparing part 902A is "10" On this occasion, the time stamp comparing part 902A outputs the value "10" to the offset adding part 906A.

Using this value, the offset adding part 906A calculates an offset value. Since the offset value is a one-way communication time (data sending time from the first wireless communication unit 10A to the second wireless communication unit 10B) in this example, the offset value is "5" which is obtained by dividing "10" by 2. The offset adding part 906A adds thus calculated offset value "5" to the time information which is outputted from the time stamp timer part 903A (e.g., "1005"), accordingly generates a time stamp "1010" and outputs the time stamp to the time stamp adding part 905A.

The time stamp adding part 905A adds the time stamp "1010" thus generated by the offset adding part 906A to the MPEG2-TS packet, and outputs the MPEG2-TS packet to the communication protocol processing part 600A.

In the second wireless communication unit 10B, the time stamp is extracted from the received MPEG2-TS packet and compared with the time information outputted the time stamp timer part 903B of the second wireless communication unit 10B. A difference between the two at this stage is the same as the result of subtraction of the data transmission time from the offset value.

In this manner, using the offset value generated by the first wireless communication unit 10A, the timing at which the receive data buffer part 907B outputs the receive data to the video signal decoding part 500B is controlled properly.

This offset value is based on the time required for communication between the first wireless communication unit 10A and the second wireless communication unit 10B. Hence, it is possible to appropriately control a period of time during which the receive data are held in the receive data buffer part 907B before outputted.

In the third embodiment the second wireless communication unit 10B sends the received data packet back to the first wireless communication unit 10A as it is. In this method a microcomputer of. the second wireless communication unit does not need to analyze the content of the data packet and the burden imposed on a microcomputer of the second wireless communication unit is light. But the amount of. information sent back from the second wireless communication unit to the first wireless communication unit becomes big.

In another embodiment the second wireless communication unit extracts the time information and a data packet ID code (data packet identification information) from the received packet data, and sends only the time information and the packet ID code back to the first wireless communication unit. With this method information amount sent back from the second wireless communication unit to the first wireless communication unit can be reduced.

In further another embodiment the second wireless communication unit extracts the time information from the received packet data, and sends only the time information back to the first wireless communication unit. This is an useful method when the first wireless communication unit can precisely judge, to which packet data was the time information sent back from the second wireless communication unit added.

Fourth Embodiment

Figure 4:
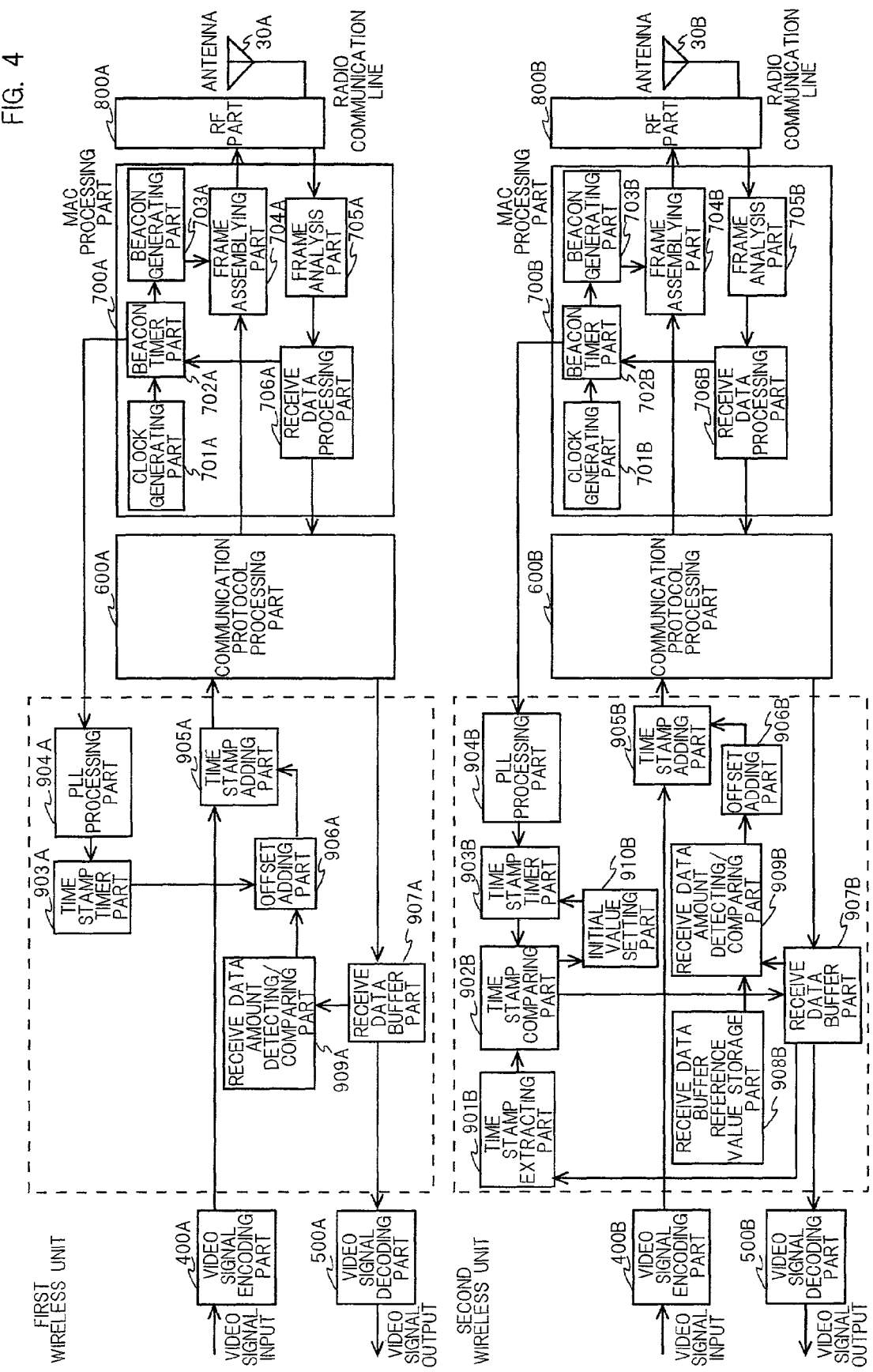
FIG. 4 is a block diagram showing the structure of a wireless communication apparatus according to a fourth embodiment of the invention.

FIG. 4 is a block diagram showing the structure of a wireless communication apparatus according to a fourth embodiment.

In FIG. 4, the offset adding part 906A of the first wireless communication unit 10A is a first offset calculating part. A receive data buffer part 907B in the second wireless communication unit 10B is a receive data buffer part. A receive data amount detecting/comparing part 909B is a receive data size detecting part.

Portions which are the same or correspond to those of the wireless communication apparatuses according to the first through the third embodiments (FIG. 1 through 3) are denoted at the same reference symbols.

In the wireless communication apparatus according to the fourth embodiment, the receive data amount detecting/comparing part 909A is newly added to the first wireless communication unit 10A, while a receive data buffer reference value storage part 908B, a receive data amount detecting/comparing part 909B and an offset adding part 906B are newly added to the second wireless communication unit 10B.

The wireless communication apparatus according to the fourth embodiment having such a structure is characterized in that the first wireless communication unit 10A calculates an offset value for time information based on the amount of data accumulated in the receive data buffer part 907B of the second wireless communication unit 10B and corrects a time stamp using this offset value.

Operations of the wireless communication apparatus according to the fourth embodiment will now be described.

First, data received in the second wireless communication unit 10B are accumulated in the receive data buffer part 907B. The receive data amount detecting/comparing part 909B detects the total size of the data accumulated in the receive data buffer part 907B. Meanwhile, the receive data amount detecting/comparing part 909B refers to a reference data size of the receive data buffer part 907B stored in the receive data buffer reference value storage part 908B, and compares the reference data size with the size of the receive data thus detected. When a difference between the two is found to be beyond a predetermined value as a result of the comparison, the second wireless communication unit 10B sends receive data buffer information which contains the receive data size and the reference data size to the first wireless communication unit 10A via the offset adding part 906B and the time stamp adding part 905B.

The first wireless communication unit 10A stores receive data buffer information sent from the second wireless communication unit 10B in the receive data buffer part 907A. The receive data amount detecting/comparing part 909A takes receive data buffer information out of the receive data buffer part 907A and outputs the receive data buffer information to the offset adding part 906A.

The offset adding part 906A calculates an offset value based on the receive data buffer information (the receive data size and the reference data size). The offset adding part 906A corrects the time information which is outputted from the time stamp timer part 903A using the calculated offset value, accordingly generates a time stamp and outputs the time stamp to the time stamp adding part 905A.

The receive data size being larger than the reference data size for instance means that the amount of the data received in the second wireless communication unit 10B has exceeded the amount of the data processed in the second wireless communication unit 10B with elapse of time. Therefore, in order to prevent overflow of the receive data in the receive data buffer part 907B, it is necessary to set the offset value to a small value.

On the other hand, the receive data size being smaller than the reference data size for instance means that the amount of the data received in the second wireless communication unit 10B has been exceeded by the amount of the data processed in the second wireless communication unit 10B with elapse of time. As a result, due to the absence of the receive data in the receive data buffer part 907B, it is impossible to output the data to the video signal decoding part 500B.

Hence, as the offset value is adjusted based on the receive data size and the reference data size received from the second wireless communication unit 10B and corrects the time stamp using the adjusted offset value, the amount of the data accumulated in the second wireless communication unit 10B is controlled.

Fifth Embodiment

Figure 5:
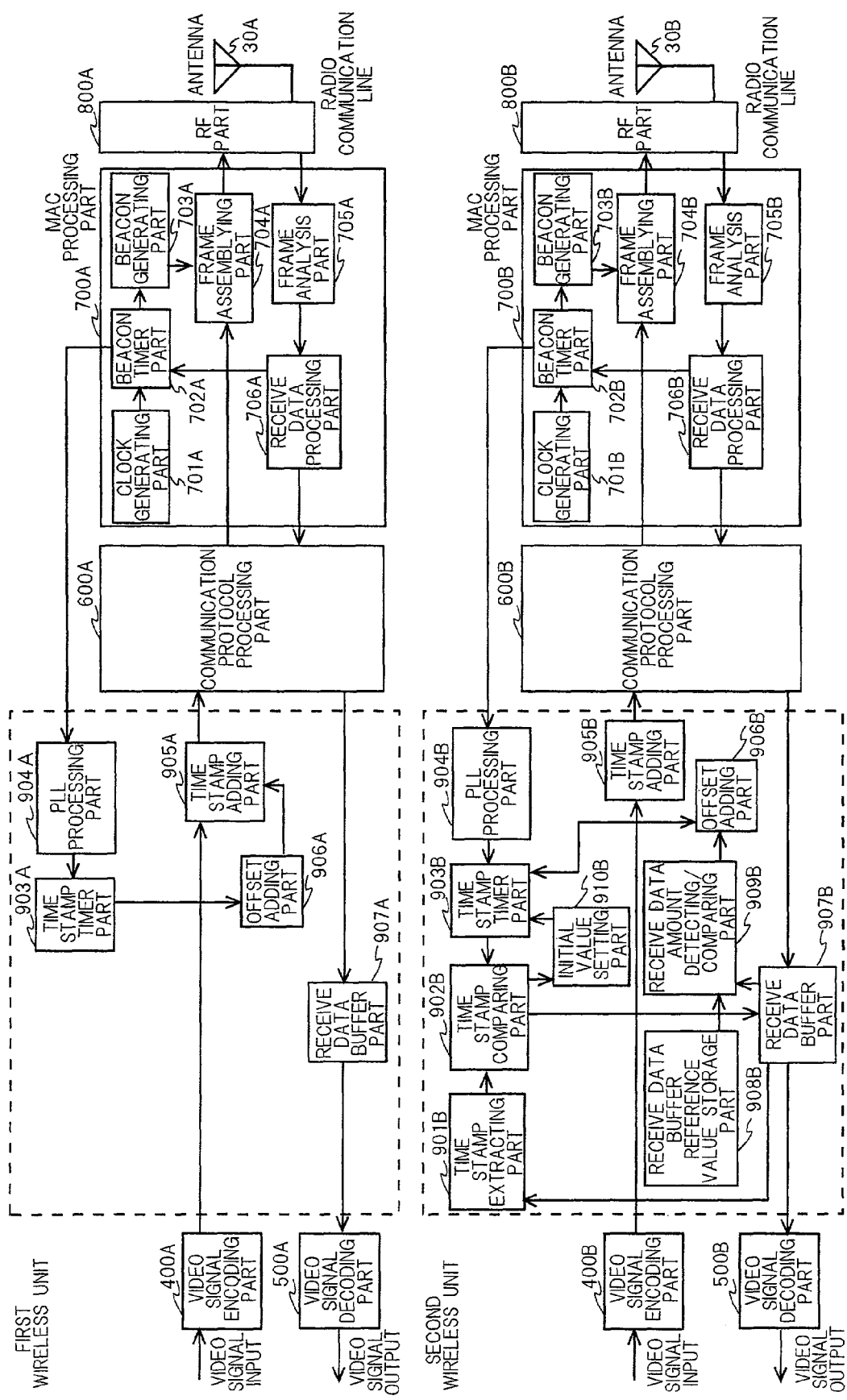
FIG. 5 is a block diagram showing the structure of a wireless communication apparatus according to a fifth embodiment of the invention.

FIG. 5 is a block diagram showing the structure of a wireless communication apparatus according to a fifth embodiment.

Portions which are the same or correspond to those of the wireless communication apparatuses according to the first through the fourth embodiments (FIG. 1 through 4) are denoted at the same reference symbols.

The wireless communication apparatus according to the fifth embodiment having such a structure is characterized in that the second wireless communication unit 10B calculates an offset value for time information based on the amount of data accumulated in the receive data buffer part 907B of the second wireless communication unit 10B.

Operations of the wireless communication apparatus according to the fifth embodiment will now be described.

First, data received in the second wireless communication unit 10B are accumulated in the receive data buffer part 907B. The receive data amount detecting/comparing part 909B detects the total size of the data accumulated in the receive data buffer part 907B. Meanwhile, the receive data amount detecting/comparing part 909B refers to a reference data size of the receive data buffer part 907B stored in the receive data buffer reference value storage part 908B, and outputs information regarding the reference data size and the size of thus detected receive data to the offset adding part 906B.

The offset adding part 906B calculates an offset value based on time information outputted from the time stamp timer part 903B and outputs the offset value to time stamp timer part 903B.

The time stamp extracting part 901B extracts the time stamp from the receive data and outputs the same to the time stamp comparing part 902B.

The time stamp comparing part 902B compares the time stamp of the receive data with the time stamp corrected using the adjusted offset which is outputted from the time stamp timer part 903B, and only when the two match with each other, outputs a control signal which permits outputting to the receive data buffer part 907B.

Upon receipt of this control signal, the receive data buffer part 907B outputs to the video signal decoding part 500B an MPEG2-TS packet which is the receive data from which the time stamp was removed.

Adjustment of an offset will now be described. When the receive data size is larger than the reference data size for instance, that is, when the amount of the data received in the second wireless communication unit 10B has exceeded the amount of the data processed in the second wireless communication unit 10B with elapse of time, it is necessary to set the offset value to a small value so that overflow of the receive data will not occur in the receive data buffer part 907B.

On the other hand, when the receive data size is smaller than the reference data size for instance, that is, when the amount of the data received in the second wireless communication unit 10B has been exceeded by the amount of the data processed in the second wireless communication unit 10B with elapse of time, the receive data disappear from the receive data buffer part 907B and it becomes impossible to output the data to the video signal decoding part 500B. With the offset value set to a large value, therefore, the amount of data accumulated in the receive data buffer part 907B is controlled.

Sixth Embodiment

Figure 6:
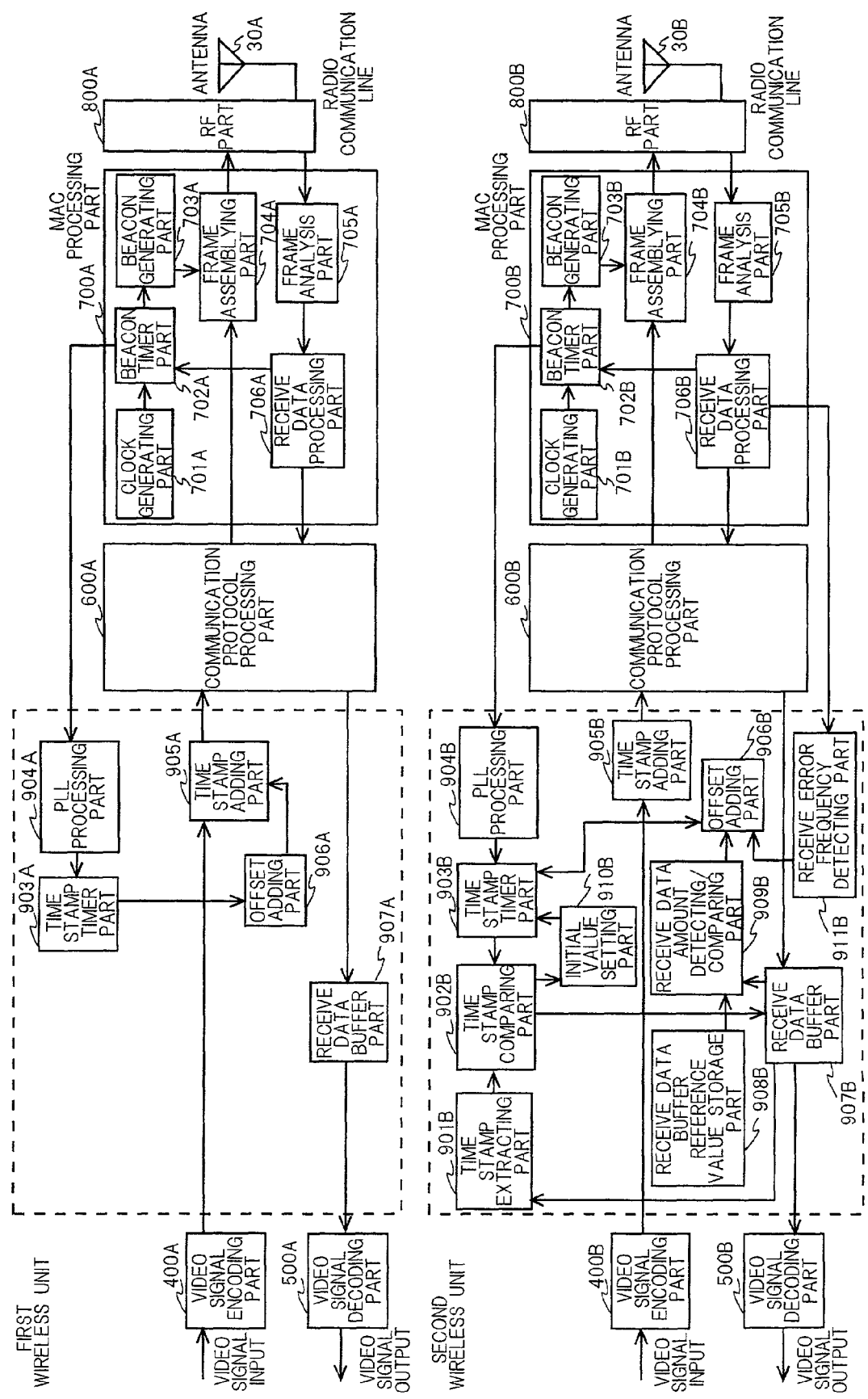
FIG. 6 is a block diagram showing the structure of a wireless communication apparatus according to a sixth embodiment of the invention.

FIG. 6 is a block diagram showing the structure of a wireless communication apparatus according to a sixth embodiment.

In FIG. 6, a receive error frequency detecting part 911B of the second wireless communication unit 10B is a receive error frequency detecting part.

Portions which are the same or correspond to those of the wireless communication apparatuses according to the first through the fifth embodiments (FIG. 1 through 5) are denoted at the same reference symbols.

In the wireless communication apparatus according to the sixth embodiment, the receive error frequency detecting part 911B is newly added to the second wireless communication unit 10B.

The wireless communication apparatus according to the sixth embodiment having such a structure is characterized in that the second wireless communication unit 10B calculates an offset value for time information based on an error frequency regarding receive data detected by the receive error frequency detecting part 911B of the second wireless communication unit 10B.

Operations of the wireless communication apparatus according to the sixth embodiment will now be described.

The receive data processing part 706B of the second wireless communication unit 10B senses a transmission error occurring over a section of the radio communication line, and upon detection of an error, the receive data processing part 706B notifies the receive error frequency detecting part 911B of the error detection.

The receive error frequency detecting part 911B detects the transmission error frequency, and outputs thus detected transmission error frequency to the offset adding part 906B.

The offset adding part 906B calculates an offset value based on the transmission error frequency and time information outputted from the time stamp timer part 903B, and outputs the offset value to time stamp timer part 903B.

Subsequent operations until outputting of an MPEG2-TS packet to the video signal decoding part 500B are similar to the operations according to the fifth embodiment.

Adjustment of an offset will now be described. When the transmission error frequency is high, failing to receive data correctly, the second wireless communication unit 10B requests the first wireless communication unit 10A for re-transmission. In the meantime, since the receive data are sent to the video signal decoding part 500B from the receive data buffer part 907B in the second wireless communication unit 10B, the amount of data accumulated in the receive data buffer part 907B keeps decreasing. Without the presence of the data in the receive data buffer part 907B, an image gets chopped. In other words, in the event that the amount of data accumulated in the receive data buffer part 907B is small, an image gets chopped as soon as the transmission error frequency becomes high. Hence, it is necessary to set the offset value large and accumulate sufficient data in the receive data buffer part 907B in advance.

On the contrary, when the transmission error frequency is low, receiving data correctly, the second wireless communication unit 10B will not request the first wireless communication unit 10A for re-transmission. In the second wireless communication unit 10B, since the receive data are sent to the video signal decoding part 500B from the receive data buffer part 907B, the amount of data accumulated in the receive data buffer part 907B remains constant or keeps increasing. If the amount of thus accumulated data keeps increasing, the receive data will flow over from the receive data buffer part 907B.

Further, if the processing is performed using too large an offset, a large difference will be created between the processing time in the first wireless communication unit 10A and the processing time in the second wireless communication unit 10B, whereby an image will be as if reproduced with delay. Hence, when this occurs, it is necessary to reduce the offset.

In this manner, as the offset is adjusted in accordance with the transmission error frequency on the radio communication line, a chopped image, a delay and the like are prevented.

Seventh Embodiment

Figure 7:
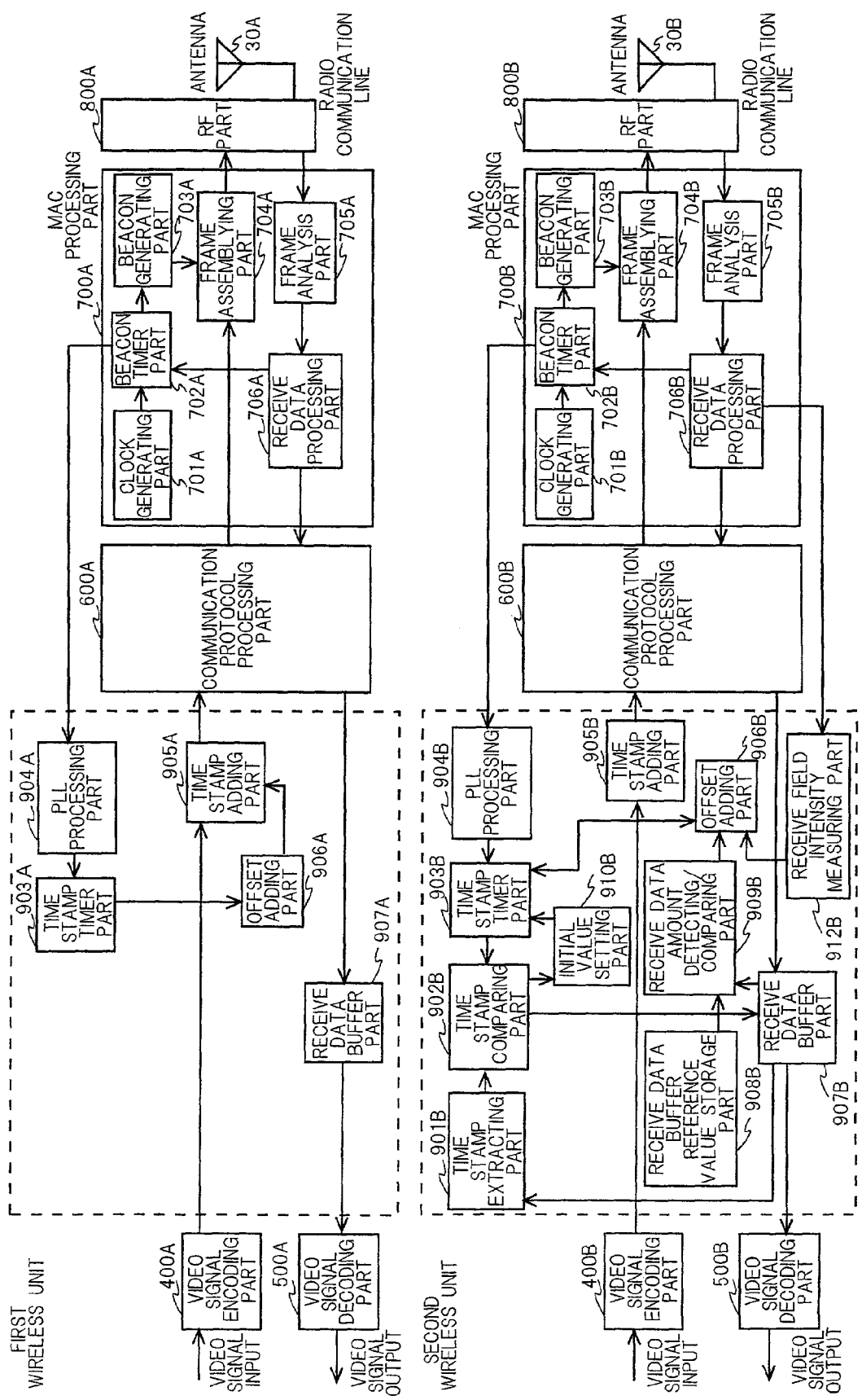
FIG. 7 is a block diagram showing the structure of a wireless communication apparatus according to a seventh embodiment of the invention.

FIG. 7 is a block diagram showing the structure of a wireless communication apparatus according to a seventh embodiment.

In FIG. 7, a receive field intensity measuring part 912B is a receive field intensity measuring part.

Portions which are the same or correspond to those of the wireless communication apparatuses according to the first through the fifth embodiments (FIG. 1 through 5) are denoted at the same reference symbols.

In the wireless communication apparatus according to the seventh embodiment, the receive field intensity measuring part 912B is newly added to the second wireless communication unit 10B.

The wireless communication apparatus according to the seventh embodiment having such a structure is characterized in that the second wireless communication unit 10B calculates an offset value for time information based on a receive field intensity value which is detected by the receive field intensity measuring part 912B of the second wireless communication unit 10B.

Operations of the wireless communication apparatus according to the seventh embodiment will now be described.

The receive field intensity measuring part 912B measures a receive field intensity over a section of the radio communication line, and outputs the receive field intensity value thus measured to the offset adding part 906B.

The offset adding part 906B calculates an offset value based on the receive field intensity value and time information which is outputted from the time stamp timer part 903B, and outputs the offset value to time stamp timer part 903B.

Subsequent operations until outputting of an MPEG2-TS packet to the video signal decoding part 500B are similar to the operations according to the fifth embodiment.

Adjustment of an offset will now be described. When the receive field intensity is weak, since it is possible that data are not received correctly or the communication itself tends to be discontinuous, the second wireless communication unit 10B is assumed to frequently request the first wireless communication unit 10A for re-transmission. In the meantime, since the receive data are sent to the video signal decoding part 500B from the receive data buffer part 907B in the second wireless communication unit 10B, the amount of data accumulated in the receive data buffer part 907B keeps decreasing. Without the presence of the data in the receive data buffer part 907B, an image gets chopped. In other words, in the event that the amount of data accumulated in the receive data buffer part 907B is small, an image gets chopped as soon as a transmission error or the like occurs. Hence, it is necessary to set the offset large and accumulate sufficient data in the receive data buffer part 907B in advance.

On the contrary, when the receive field intensity is strong, the radio communication line does not get interrupted and data are received relatively correctly, and therefore, the second wireless communication unit 10B will not request the first wireless communication unit 10A for re-transmission. In the second wireless communication unit 10B, since the receive data are sent to the video signal decoding part 500B from the receive data buffer part 907B, the amount of data accumulated in the receive data buffer part 907B remains constant or keeps increasing. If the amount of thus accumulated data keeps increasing, the receive data will flow over from the receive data buffer part 907B. In addition, if the processing is performed using too large an offset, a large difference will be created between the processing time in the first wireless communication unit 10A and the processing time in the second wireless communication unit 10B, whereby an image will be as if reproduced with delay. Hence, when this occurs, it is necessary to reduce the offset.

In this manner, as the offset is adjusted in accordance with whether the receive field intensity is strong or weak over a section of the radio communication line, a chopped image, a delay and the like are prevented.

Eighth Embodiment

Figure 8:
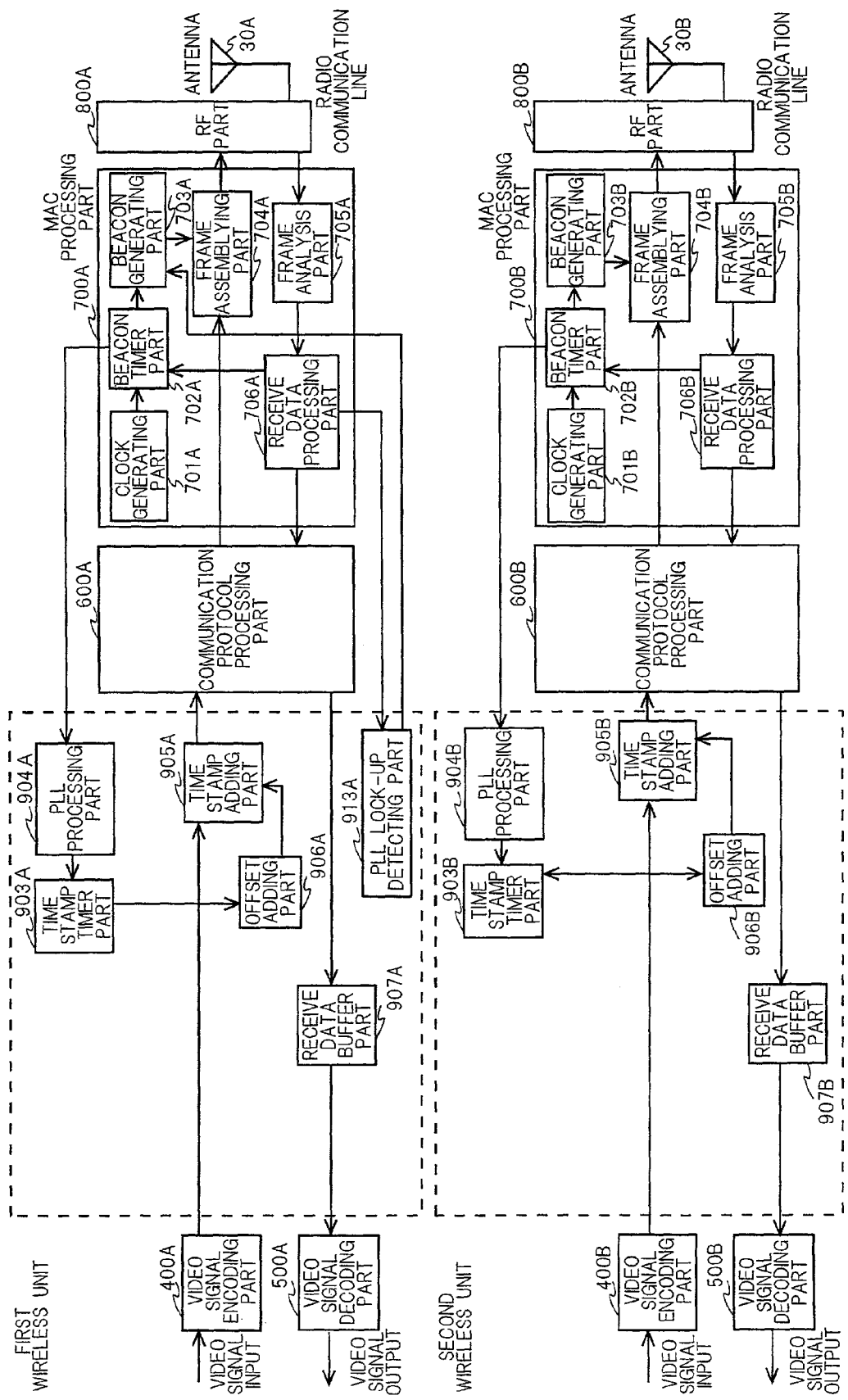
FIG. 8 is a block diagram showing the structure of a wireless communication apparatus according to an eighth embodiment of the invention.

FIG. 8 is a block diagram showing the structure of a wireless communication apparatus according to an eighth embodiment.

In FIG. 8, the beacon generating part 703A and the frame assembling part 704A of the first wireless communication unit 10A form a sending cycle setting part.

Portions which are the same or correspond to those of the wireless communication apparatuses according to the first through the fourth embodiments (FIG. 1 through 4) are denoted at the same reference symbols.

In the wireless communication apparatus according to the eighth embodiment, a PLL lock-up detecting part 913A which detects locking up of PLL is newly added to the first wireless communication unit 10A.

The wireless communication apparatus according to the eighth embodiment having such a structure is characterized in that the first wireless communication unit 10A has a function of adjusting a beacon sending cycle.

Operations of the wireless communication apparatus according to the eighth embodiment will now be described.

First, upon recognition by the first wireless communication unit 10A of a new second wireless communication unit 10B over the radio communication line or prior to stream transmission to the second wireless communication unit 10B over the radio communication line, in the first wireless communication unit 10A, the PLL lock-up detecting part 913A instructs the beacon generating part 703A to shorten the beacon cycles.

Receiving the instruction, the beacon generating part 703A sends out the beacons in short intervals to the frame assembling part 704A, whereby data are sent in agreement with the timing of the beacons.

In general, when the beacon cycles are elongated, the second wireless communication unit 10B takes a long time to lock up PLL, and therefore, a long time is required for normal stream transmission.

Hence, as the PLL lock-up time is adjusted and shortened, and such a problem is avoided.

Ninth Embodiment

Figure 9:
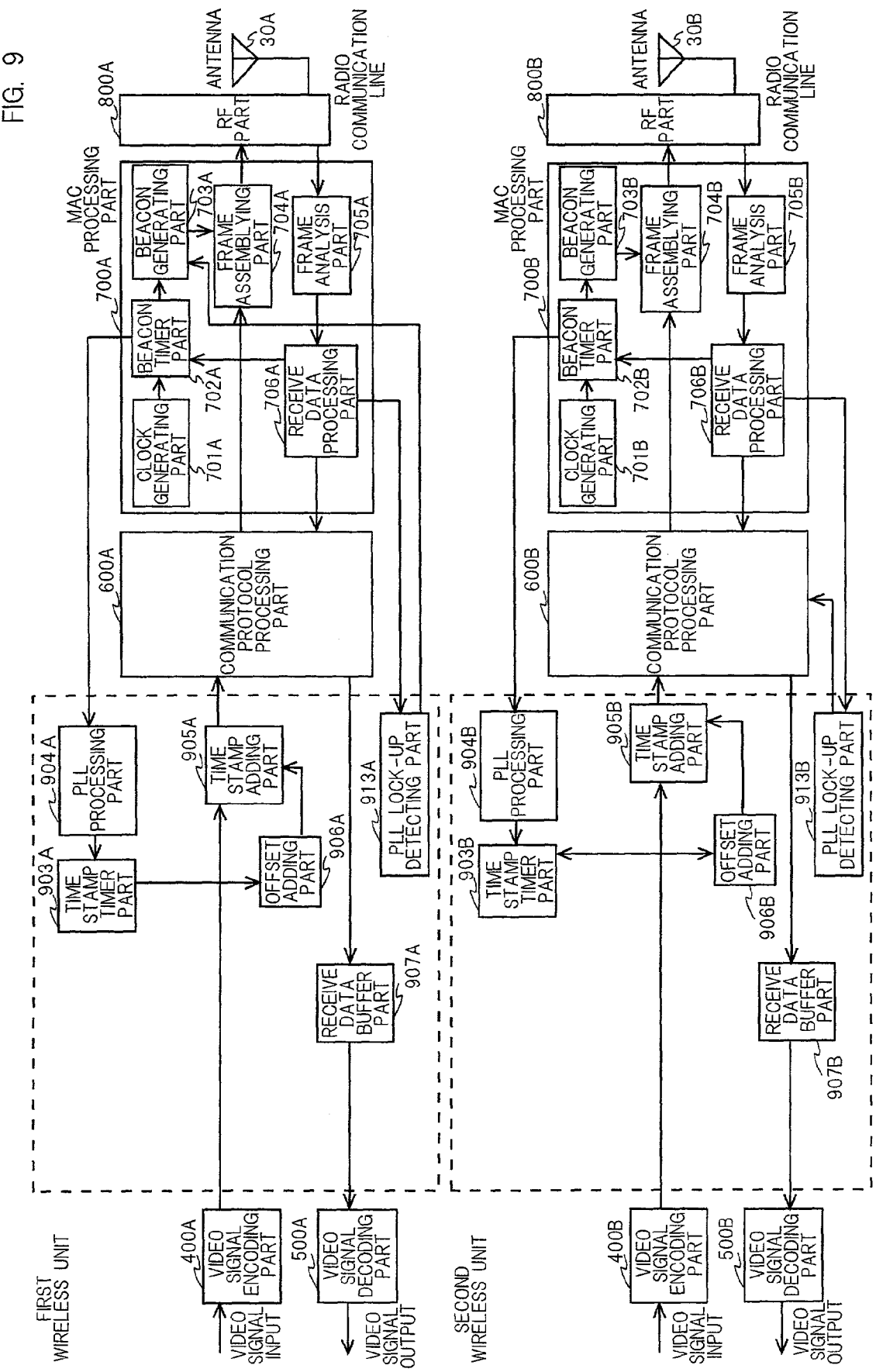
FIG. 9 is a block diagram showing the structure of a wireless communication apparatus according to a ninth embodiment of the invention.

FIG. 9 is a block diagram showing the structure of a wireless communication apparatus according to a ninth embodiment.

In FIG. 9, a PLL lock-up detecting part 913B of the second wireless communication unit 10B is a PLL lock-up detecting part.

Portions which are the same or correspond to those of the wireless communication apparatuses according to the first through the fourth embodiments (FIG. 1 through 4) are denoted at the same reference symbols.

In the wireless communication apparatus according to the ninth embodiment, the PLL lock-up detecting part 913B which detects locking up of PLL is newly added to the second wireless communication unit 10B.

The wireless communication apparatus according to the ninth embodiment having such a structure is characterized in that the first wireless communication unit 10A has a function of adjusting the beacon sending cycle based on PLL lock-up information detected by the second wireless communication unit 10B.

Operations of the wireless communication apparatus according to the ninth embodiment will now be described.

First, in the event of locking up of PLL by the second wireless communication unit 10B, the PLL lock-up detecting part 913B generates locking-up detection information. The generated locking-up detection information is sent to the first wireless communication unit 10A through the communication protocol processing part 600B. Based on the locking-up detection information received from the second wireless communication unit 10B, the PLL lock-up detecting part 913A of the first wireless communication unit 10A instructs the beacon generating part 703A to change the beacon cycle.

Receiving the instruction, the beacon generating part 703A sends out data at the timing of the changed sending cycle through the frame assembling part 704A.

In this manner, as locking up of PLL in the second wireless communication unit 10B is detected in advance and a video signal is thereafter sent, a problem that the second wireless communication unit 10B fails to normally receive the video signal is avoided.

Tenth Embodiment

Figure 10:
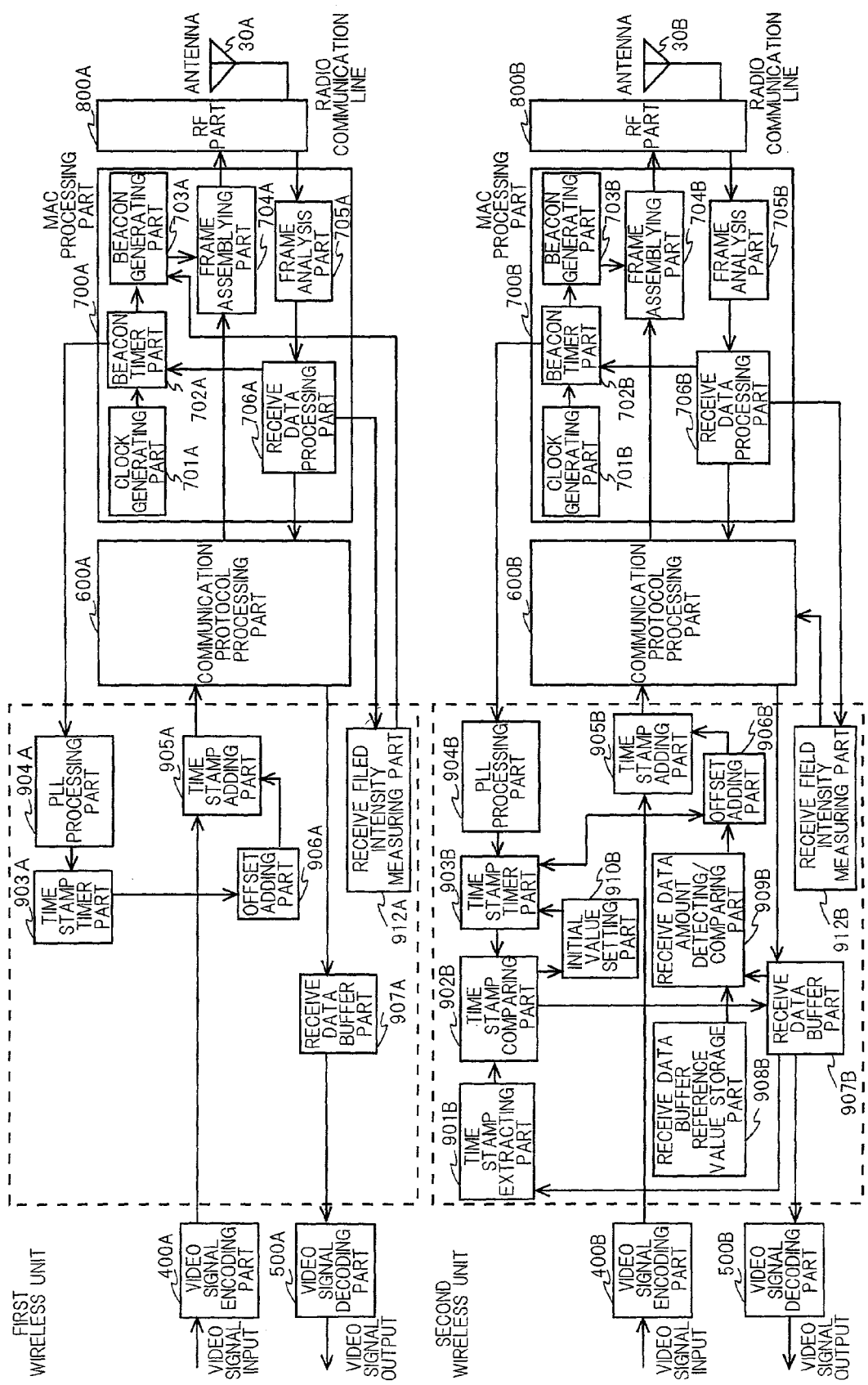
FIG. 10 is a block diagram showing the structure of a wireless communication apparatus according to a tenth embodiment of the invention.

FIG. 10 is a block diagram showing the structure of a wireless communication apparatus according to a tenth embodiment.

In FIG. 10, the receive field intensity measuring part 912B of the second wireless communication unit 10B is a receive field intensity measuring part.

Portions which are the same or correspond to those of the wireless communication apparatuses according to the first through the fourth and the seventh embodiments (FIG. 1 through 4 and 7) are denoted at the same reference symbols.

In the wireless communication apparatus according to the tenth embodiment, a receive field intensity measuring part 912A is newly added to the first wireless communication unit 10A.

The wireless communication apparatus according to the tenth embodiment having such a structure is characterized in that the first wireless communication unit 10A has a function of adjusting the beacon sending cycle based on the receive field intensity value thus measured by the second wireless communication unit 10B.

Operations of the wireless communication apparatus according to the tenth embodiment will now be described.

First, the receive field intensity measuring part 912B of the second wireless communication unit 10B measures the receive field intensity over a section of the radio communication line. The receive field intensity value thus measured is sent to the first wireless communication unit 10A through the communication protocol processing part 600B. Based on the receive field intensity value from the second wireless communication unit 10B, the receive field intensity measuring part 912A of the first wireless communication unit 10A instructs the beacon generating part 703A to change the beacon cycle.

Setup of the beacon cycles will now be described. When the receive field intensity is weak for instance, it is possible that data are not received correctly because the communication state is poor or because the communication itself tends to be discontinuous. Due to this, the beacon signal may not be received sometimes and locking up of PLL may therefore fail. Hence, shortening the beacon cycles realizes an improvement that the beacon cycles are missed less frequently and losing synchronization of PLL is prevented.

On the other hand, when the receive field intensity is strong, the radio communication line does not get interrupted and data are received relatively correctly, and therefore, the second wireless communication unit 10B will not request the first wireless communication unit 10A for re-transmission. In the second wireless communication unit 10B, since the beacons are received without fail and locking up of PLL is right, frequent transmission of the beacons leads to a decrease in transmission rate of data and a consumption of a transmission energy. Hence, the beacon cycles are set long when the receive field intensity is strong. This solves the problem of a lowered transmission throughput and energy consumption.

Eleventh Embodiment

Figure 11:
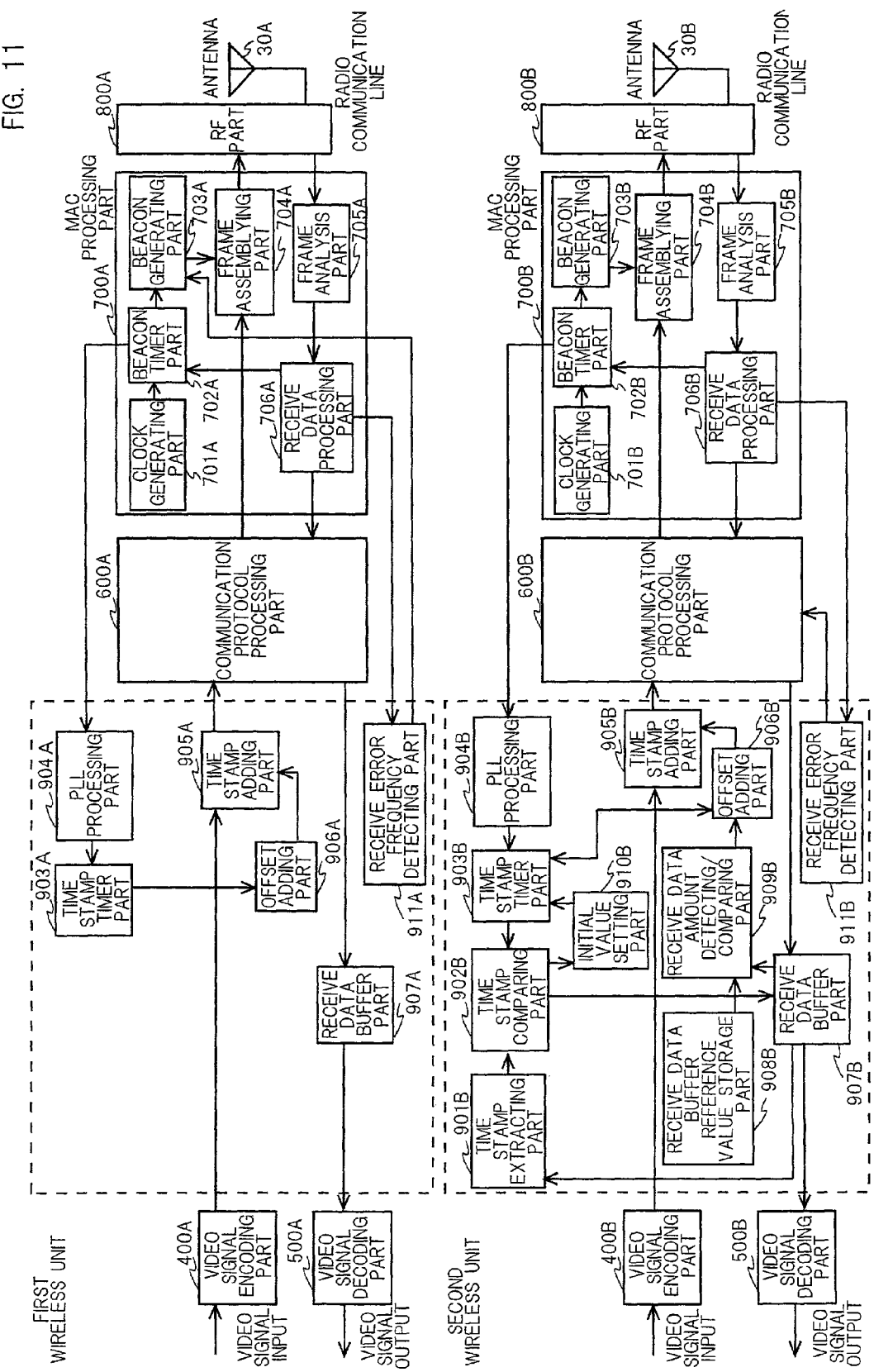
FIG. 11 is a block diagram showing the structure of a wireless communication apparatus according to an eleventh embodiment of the invention.

FIG. 11 is a block diagram showing the structure of a wireless communication apparatus according to an eleventh embodiment.

In FIG. 11, the receive error frequency detecting part 911B of the second wireless communication unit 10B is a receive error frequency detecting part.

Portions which are the same or correspond to those of the wireless communication apparatuses according to the first through the fourth and the sixth embodiments (FIG. 1 through 4 and 6) are denoted at the same reference symbols.

In the wireless communication apparatus according to the eleventh embodiment, a receive error frequency detecting part 911A is newly added to the first wireless communication unit 10A.

The wireless communication apparatus according to the eleventh embodiment having such a structure is characterized in that the first wireless communication unit 10A has a function of adjusting the beacon sending cycle based on a receive error frequency which is detected by the second wireless communication unit 10B.

Operations of the wireless communication apparatus according to the eleventh embodiment will now be described.

The receive data processing part 706B of the second wireless communication unit 10B senses a transmission error occurring over a section of the radio communication line, and upon detection of an error, the receive data processing part 706B notifies the receive error frequency detecting part 911B of the error detection.

The receive error frequency detecting part 911B detects the frequency at which transmission errors occur, and generates error frequency information. Thus generated error frequency information is sent to the first wireless communication unit 10A through the communication protocol processing part 600B. Based on the error frequency information from the second wireless communication unit 10B, the receive error frequency detecting part 911A of the first wireless communication unit 10A instructs the beacon generating part 703A to change the beacon cycles.

Receiving the instruction, the beacon generating part 703A sends out data at the timing of the changed sending cycle through the frame assembling part 704A.

In this manner, the error frequency information detected in the second wireless communication unit 10B is sent to the first wireless communication unit 10A and the beacon cycles are adjusted based on this error frequency information. Hence, when the transmission error frequency is high for example, by shortening the beacon cycles, it is possible to achieve an improvement that the beacon cycles are missed less frequently and losing synchronization of PLL is prevented.

On the contrary, when the transmission error frequency is low, the beacon cycles are set long, so that the problem of a lowered transmission throughput and energy consumption is resolved.

As is clear from the detailed description above on the embodiments, the present invention attains the following effects.

With the wireless communication apparatus according to the present invention, during stream transmission of a video signal, etc., the sending side and the receiving side can be synchronized to each other without fail, and therefore, it is possible to prevent missing video frames and accurately reproduce the video signal.

The wireless communication apparatus according to the present invention have a function of detecting a transmission time and adjusts the timing of the synchronization based on the transmission time. Hence, the wireless communication apparatus according to the present invention is less susceptible to an influence of a change in state of electric wave propagation and capable of accurately reproducing the video signal.

The wireless communication apparatus according to the present invention has a function of detecting a transmission error frequency at which transmission errors occur on the receiving side and adjusts the timing of the synchronization based on the transmission error frequency. Hence, the wireless communication apparatus according to the present invention is less susceptible to an influence of a state in condition of electric wave propagation and capable of accurately reproducing the video signal.

The wireless communication apparatus according to the present invention has a function of measuring a receive field intensity on the receiving side and adjusts the timing of the synchronization based on the receive field intensity value thus measured. Hence, the wireless communication apparatus according to the present invention is less susceptible to an influence of a change in state of electric wave propagation and capable of accurately reproducing the video signal.

Since the wireless communication apparatus according to the present invention can adjust beacon cycles on the sending side, it is possible to reduce a period of time until it becomes possible to execute stream transmission toward the receiving side.

Since the wireless communication apparatus according to the present invention allows the sending side to sense locking up of PLL on the receiving side and thereafter permits stream transmission, the receiving side can receive a stream signal without fail.

The wireless communication apparatus according to the present invention is capable of adjusting beacon sending cycles on the sending side in accordance with the receive field intensity value, and therefore, is less influenced by a change in state of electric wave propagation. Hence, when the receive field intensity is weak, shortening the beacon cycles realizes an improvement that the beacon cycles are missed less frequently and losing synchronization of PLL is prevented. When the receive field intensity is strong, setting the beacon cycles long solves a problem of a lowered transmission throughput and energy consumption.

The wireless communication apparatus according to the present invention is capable of adjusting beacon sending cycles on the receiving side in accordance with the transmission error frequency on the sending side, and therefore, is less influenced by a change in state of electric wave propagation. Hence, when the transmission error frequency is high, shortening the beacon cycles realizes an improvement that the beacon cycles are missed less frequently and losing synchronization of PLL is prevented. When the transmission error frequency is low, setting the beacon cycles long solves a problem of a lowered transmission throughput and energy consumption.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A first wireless communication unit which transmits a video signal as packet data between said first wireless communication unit and a second wireless communication unit which are connected on a radio line, characterized in comprising:
    a time information generating part which generates first time information;
    a time information sending part which intermittently sends said first time information in a predetermined cycle; and
    a time information adding part which adds said first time information or time information which is obtained based on said first time information to a data packet of a video signal which is to be sent.

2. A second wireless communication unit which receives a video signal as packet data transmitted between said second wireless communication unit and a first wireless communication unit which are connected on a radio line, characterized in comprising:
    a first PLL part which receives first time information intermittently sent from said first wireless communication unit in a predetermined cycle and generates second time information which reproduces said first time information; and
    a first time information comparing part which compares said second time information with time information which is added to a data packet of said video signal transmitted from said first wireless communication unit (hereinafter referred to as a "receive data packet") and controls the output timing of outputting said receive data packet in accordance with a result of the comparison.

3. The first wireless communication unit of claim 1, characterized in that:
    a second PLL part which generates more accurate time information than said first time information based on said first time information is further comprised; and
    said time information adding part adds time information generated by said second PLL part to a data packet of a video signal which is to be sent.

4. A wireless communication apparatus, characterized in comprising:
    the first wireless communication unit of claim 1 or 3; and
    the second wireless communication unit of claim 2.

5. The second wireless communication unit of claim 2, characterized in resending at least said time information, which is added to a data packet of a video signal, to said first wireless communication unit.

6. The first wireless communication unit of claim 1, characterized in further comprising:
    a second time information comparing part which compares time information which is re-sent from said second wireless communication unit with said first time information or time information which is obtained based on said first time information; and
    a first offset calculating part which calculates an offset value based on a result of the comparison executed by said second time information comparing part, and generates time information which is obtained by correcting, with said offset value, said first time information or said time information which is obtained based on said first time information;
    and characterized in that said time information adding part adds time information generated by said first offset calculating part to a data packet of a video signal which is to be sent.

7. A wireless communication apparatus, characterized in comprising:
    the first wireless communication unit of claim 6; and
    the second wireless communication unit of claim 5.

8. The second wireless communication unit of claim 2, characterized in further comprising:
    a receive data buffer part which temporarily holds a receive data packet until outputting said receive data packet; and
    a receive data size detecting part which detects the size of said receive data packet which is held in said receive data buffer part (hereinafter referred to as a "receive data size"),
    and characterized in sending, to said first wireless communication unit, receive data buffer information which contains at least either one of said receive data size detected by said receive data size detecting part and a result of comparison between said receive data size and a reference data size which is set in advance.

9. The first wireless communication unit of claim 1, characterized in further comprising a first offset calculating part which:
- calculates an offset value based on receive data buffer information which contains at least either one of the size of a receive data packet which is temporarily held in a receive data buffer part of said second wireless communication unit and a result of comparison between said receive data size and a reference data size which is set in advance; and
- generates time information which is obtained by correcting, with said offset value, said first time information or time information which is obtained based on said first time information.

10. A wireless communication apparatus, characterized in comprising:
- the first wireless communication unit of claim 9; and
- the second wireless communication unit of claim 8.

11. The second wireless communication unit of claim 2, characterized in further comprising:
- a receive data buffer part which temporarily holds a receive data packet until outputting said receive data packet;
- a receive data size detecting part which detects the receive data size of a receive data packet which is held in said receive data buffer part; and
- a second offset calculating part which calculates an offset value based on receive data buffer information which contains at least either one of the receive data size detected by said receive data size detecting part and a result of comparison between said receive data size and a reference data size which is set in advance,
- and characterized in that said first time information comparing part compares time information which is obtained by correcting said second time information with said offset value with time information which is added to said receive data packet, and controls the output timing of outputting said receive data packet in accordance with a result of the comparison.

12. The second wireless communication unit of claim 2, characterized in further comprising:
- a receive error frequency detecting part which detects a frequency at which receive data become an error; and
- a second offset calculating part which calculates an offset value based on the receive error frequency detected by said receive error frequency detecting part,
- and characterized in that said first time information comparing part compares time information which is obtained by correcting said second time information with said offset value with time information which is added to said receive data packet, and controls the output timing of outputting said receive data packet in accordance with a result of the comparison.

13. The second wireless communication unit of claim 2, characterized in further comprising:
- a receive field intensity measuring part which measures a receive field intensity value; and
- a second offset calculating part which calculates an offset value based on a receive field intensity value measured by said receive field intensity measuring part,
- and characterized in that said first time information comparing part compares time information which is obtained by correcting said second time information with said offset value with time information which is added to said receive data packet, and controls the output timing of outputting said receive data packet in accordance with a result of the comparison.

14. The first wireless communication unit of claim 1, characterized in further comprising a sending cycle setting part which changes a sending cycle of said time information sending part.

15. The second wireless communication unit of claim 2, characterized in further comprising a PLL lock-up detecting part which detects locking-up of said first PLL part and generates PLL lock-up information which is indicative of the locking-up of said first PLL part,
and characterized in that said first wireless communication unit is notified of said PLL lock-up information.

16. The first wireless communication unit of claim 14, characterized in that said sending cycle setting part changes the sending cycle of said time information sending part based on PLL lock-up information which is sent from said second wireless communication unit and indicative of locking-up of said first PLL part.

17. A wireless communication apparatus, characterized in comprising:
- the first wireless communication unit of claim 16; and
- the second wireless communication unit of claim 15.

18. The second wireless communication unit of claim 2, characterized in further comprising a receive field intensity measuring part which measures a receive field intensity value,
and characterized in that said receive field intensity value is sent to said first wireless communication unit.

19. The first wireless communication unit of claim 14, characterized in that said sending cycle setting part changes the sending cycle of said time information sending part based on a receive field intensity value of said second wireless communication unit sent from said second wireless communication unit.

20. A wireless communication apparatus, characterized in comprising:
- the first wireless communication unit of claim 19; and
- the second wireless communication unit of claim 18.

21. The second wireless communication unit of claim 2, characterized in further comprising a receive error frequency detecting part. which detects a frequency at which receive data become an error,
and characterized in that said receive error frequency detected by said receive error frequency detecting part is sent to said first wireless communication unit.

22. The first wireless communication unit of claim 14, characterized in that said sending cycle setting part changes the sending cycle of said time information sending part based on a receive error frequency of said second wireless communication unit sent from said second wireless communication unit.

23. A wireless communication apparatus, characterized in comprising:
- the first wireless communication unit of claim 22; and
- the second wireless communication unit of claim 21.

* * * * *